US009977983B2

(12) United States Patent
Kochi et al.

(10) Patent No.: US 9,977,983 B2
(45) Date of Patent: May 22, 2018

(54) OPTICAL DATA PROCESSING DEVICE, OPTICAL DATA PROCESSING SYSTEM, OPTICAL DATA PROCESSING METHOD, AND OPTICAL DATA PROCESSING PROGRAM

(71) Applicant: KABUSHIKI KAISHA TOPCON, Tokyo (JP)

(72) Inventors: Nobuo Kochi, Odawara (JP); Kazuo Kitamura, Kasukabe (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 260 days.

(21) Appl. No.: 14/420,401

(22) PCT Filed: Jun. 20, 2013

(86) PCT No.: PCT/JP2013/066967
§ 371 (c)(1),
(2) Date: Feb. 9, 2015

(87) PCT Pub. No.: WO2014/024579
PCT Pub. Date: Feb. 13, 2014

(65) Prior Publication Data
US 2015/0206023 A1  Jul. 23, 2015

(30) Foreign Application Priority Data

Aug. 9, 2012 (JP) .................................. 2012-177504

(51) Int. Cl.
*G06K 9/46* (2006.01)
*G01B 11/00* (2006.01)
(Continued)

(52) U.S. Cl.
CPC ............ *G06K 9/4604* (2013.01); *G01B 11/00* (2013.01); *G06K 9/6215* (2013.01); *G06T 3/403* (2013.01);
(Continued)

(58) Field of Classification Search
CPC .... G01B 11/00; G06K 9/4604; G06K 9/6215; G06T 15/20; G06T 17/00; G06T 17/05;
(Continued)

(56) References Cited

U.S. PATENT DOCUMENTS 8,045,762 B2    10/2011  Otani et al.
2013/0181983 A1  7/2013  Kitamura et al.

FOREIGN PATENT DOCUMENTS

JP        10-206135    *  8/1998
JP        H10-206135 A     8/1998
(Continued)

OTHER PUBLICATIONS

Takachi et al, Machine Translation of Foreign application JP 2012-088114, Jan. 6, 2017.*
(Continued)

*Primary Examiner* — Edward Park
(74) *Attorney, Agent, or Firm* — Oblon, McClelland, Maier & Neustadt, L.L.P.

(57) ABSTRACT

A processing for specifying a correspondence relationship of feature points between two sets of optical data can be highly precise and efficiently carried out. The correspondence relationship of the perpendicular edges is obtained based on the assumption that the object is a building, in the processing for integrating the three-dimensional model obtained from the point cloud position data and the three-dimensional model obtained from the stereophotographic image. In this case, one perpendicular edge is defined by the relative position relationship with the other perpendicular edge, and the
(Continued)

correspondence relationship is high-precisely and rapidly searched.

12 Claims, 14 Drawing Sheets

(51) Int. Cl.
    *G06K 9/62*         (2006.01)
    *G06T 3/40*         (2006.01)
    *G06T 15/20*       (2011.01)
    *G06T 17/00*       (2006.01)
    *G06T 17/05*       (2011.01)
    *G06T 17/10*       (2006.01)
    *G06T 7/593*       (2017.01)

(52) U.S. Cl.
    CPC .............. *G06T 7/593* (2017.01); *G06T 15/20* (2013.01); *G06T 17/00* (2013.01); *G06T 17/05* (2013.01); *G06T 17/10* (2013.01); *G06T 2210/56* (2013.01)

(58) Field of Classification Search
    CPC ......... G06T 17/10; G06T 3/403; G06T 7/593; G06T 2210/56
    See application file for complete search history.

(56) References Cited

FOREIGN PATENT DOCUMENTS

| | | | |
|---|---|---|---|
| JP | 2008-082707 A | | 4/2008 |
| JP | 2012-008867 A | | 1/2012 |
| JP | 2012-088114 | * | 5/2012 |
| JP | 2012-088114 A | | 5/2012 |
| WO | 2011/162388 A1 | | 12/2011 |
| WO | 2012/053521 A1 | | 4/2012 |

OTHER PUBLICATIONS

Sumi et al, Machine Translation of Foreign application JP 10-206135, Jan. 6, 2017.*
Wang, Caihua et al, "Location and Pose Estimation for Active Vision Using Edge Histograms of Omni-directional Images", IEEE, Oct. 11, 2002, vol. 102, No. 380, pp. 41-46.*
Wang et al., "Location and Pose Estimation for Active Vision Using Edge Histograms of Omni-directional Images", IEICE Technical Report, Oct. 11, 2002, vol. 102, No. 380, pp. 41-46.
Sep. 10, 2013 Search Report issued in International Application No. PCT/JP2013/066967.

* cited by examiner

OPTICAL DATA PROCESSING DEVICE, OPTICAL DATA PROCESSING SYSTEM, OPTICAL DATA PROCESSING METHOD, AND OPTICAL DATA PROCESSING PROGRAM

BACKGROUND OF THE INVENTION

Technical Field

The present invention relates to an optical data processing technique, and specifically relates to a technique for integrally processing three-dimensional data obtained from different points of view.

Background Art

A technique in which a three-dimensional position of an object to be measured is obtained as a large number of point cloud position data by irradiating a laser beam onto object to be measured while scanning, and a three-dimensional shape of the object to be measured is calculated by this point cloud position data, has been known (see Patent Document 1). In the point cloud position data, a two-dimensional image and three-dimensional coordinates are combined. That is, in the point cloud position data, data of a two-dimensional image of an object, multiple measured points (point cloud) corresponding to this two-dimensional image, and position in three-dimensional space (three-dimensional coordinates) of these multiple measured points are related. By using the point cloud position data, a three-dimensional model in which a surface configuration of the object is duplicated by a series of points can be obtained. In addition, since each three-dimensional coordinate is obvious, relative positional relationship in three-dimensional space among the points can be understood; therefore, a processing revolving around the three-dimensional model image displayed and a processing switching to an image seen from a different viewpoint can be realized.

In the case in which the point cloud position data is obtained from one viewpoint, point cloud position data of a part in which a shadow is formed by a shape of the object to be measured or an obstruction when it is viewed from the viewpoint, cannot be obtained. This phenomenon is called occlusion, and this shadow part is called an occlusion portion and an occlusion part. There is a problem in which occlusion is generated by flickering images of passersby, passing vehicles, trees, etc.

As an approach for solving the problem, Patent Document 2 discloses a method in which in addition to a basic acquisition of the point cloud position data, the occlusion part is photographed from different viewpoints and the relationship between this photographic image and the above basic point cloud position data is determined, so as to compensate the point cloud position data of the occlusion part.

Patent Document 1 is Japanese Unexamined Patent Application Publication Laid-open No. 2012-8867. Patent Document 2 is Japanese Unexamined Patent Application Laid-open No. 2008-82707.

The point cloud position data consists of tens of thousands of points to hundreds of millions of points, and positioning of the point cloud position data and the photographic image is required. This processing is complicated, and required processing time is long. As a method of this positioning, a technique in which multiple targets are previously adhered to the object to be measured, so that the correspondence relationship between the point cloud position data and the feature point in the photographic image is clear, and the point cloud position data and the feature point in the photographic image are positioned based on the multiple targets, can be used. However, in this technique, it is necessary to adhere the targets to the object to be measured, and for example, the targets cannot be simply adhered when the object to be measured is a tall building, etc.

In addition, a method in which the matching between data is carried out by using software can also be used. However, there are problems in that a matching error is large, a required processing time is too long, and a large burden is applied to a calculating device. In view of such circumstances, an object of the present invention is to provide a technique in which processing for specifying a correspondence relationship of feature points between two sets of optical data can be carried out with high precision and extremely efficiently.

DISCLOSURE OF THE INVENTION

A first aspect of the present invention has an optical data processing device including an extracting unit for extracting multiple three-dimensional edges that extend in a specific direction from a first three-dimensional model, as a first group of three-dimensional edges, and for extracting multiple three-dimensional edges that extend in the specific direction from a second three-dimensional model, as a second group of three-dimensional edges, a similarity calculating unit for calculating a similarity between each of the first group of three-dimensional edges and each of the second group of three-dimensional edges, and a selecting unit for selecting one edge in the second group of three-dimensional edges corresponding to one edge in the first group of three-dimensional edges based on the similarity.

According to the first aspect, multiple three-dimensional edges that extend in the specific direction in each of two three-dimensional models are focused on, the similarity between two three-dimensional models is obtained, and three-dimensional edges which correspond between both models are selected based on this similarity. When the three-dimensional edges are handled, an amount of data to be handled is less than that in the case in which a point cloud itself is handled, and the three-dimensional edge is easily understood (in other words, it is easily distinguished from other parts). Therefore, a processing for specifying a correspondence relationship between both of the three-dimensional models can be carried out with high precision and extremely efficiently.

A second aspect of the present invention has an optical data processing device according to the first aspect of the present invention, further including a specifying unit for specifying a relative position against other multiple three-dimensional edges in each of the first group of three-dimensional edges and a relative position against other multiple three-dimensional edges in each of the second group of three-dimensional edges, wherein the similarity calculating unit calculates a similarity between the relative positions. The relative position between the three-dimensional edge that extends in the specific direction and the multiple three-dimensional edges that extend in a similar direction is an inherent parameter for specifying the three-dimensional edge. Therefore, three-dimensional edges that correspond between two three-dimensional models can be specified by evaluating the similarity of this relative position between the three-dimensional edges. This processing can be extremely rapid and be carried out with extreme precision, since an amount of data to be handled is reduced and the matching accuracy is high.

A third aspect of the present invention has an optical data processing device according to the second aspect of the present invention, wherein the relative position is defined by a combination of multiple vectors in which a specific three-dimensional edge and other multiple three-dimensional edges are connected. According to the third aspect, the similarity can be efficiently judged by calculating.

A fourth aspect of the present invention has an optical data processing device according to the third aspect of the present invention, wherein the similarity is evaluated by lengths of the multiple vectors and angles of the multiple vectors against a predetermined first direction. According to the fourth aspect, the similarity can be efficiently judged by calculating.

A fifth aspect of the present invention has an optical data processing device according to any one of the first aspect to the fourth aspect of the present invention, wherein the specific direction is a perpendicular direction. In a building, since the perpendicular edge is a main component, the calculation can be more efficiently carried out by searching the correspondence relationship between three-dimensional models using the perpendicular edge when the building is an object to be measured.

A sixth aspect of the present invention has an optical data processing device according to any one of the first aspect to the fifth aspect of the present invention, wherein the three-dimensional edge is specified by endpoints of a line segment that constitutes the three-dimensional edge. By specifying the edge using both endpoints, an amount of data to be handled can be reduced and a burden to be calculated can be decreased.

A seventh aspect of the present invention has an optical data processing device according to any one of the first aspect to the sixth aspect of the present invention, wherein at least one of the first three-dimensional model and the second three-dimensional model is a three-dimensional model based on a stereophotographic image. According to the seventh aspect, for example, a degree of perfection of the three-dimensional model can be further increased by compensating for an occlusion part in the three-dimensional model obtained from a laser scanner using photography. In addition, for example, a degree of perfection of the three-dimensional model can be further increased by integrating two three-dimensional models based on a stereophotographic image. Here, in this specification, a three-dimensional model based on three-dimensional point cloud position data obtained from reflected light of a laser beam is described as a laser point cloud three-dimensional model, and a three-dimensional model based on stereophotographic images is described as an image measuring a three-dimensional model.

A eighth aspect of the present invention has an optical data processing device according to the seventh aspect of the present invention, further including an external orientation element calculating unit for calculating an external orientation element of left and right photographic images based on a perpendicular edge in the left and right photographic images that constitute the stereophotographic image. According to the eighth aspect, the corresponding point for an external orientation in the left and right photographic images is extracted without deflection by using the perpendicular edge, and therefore, the external orientation element can be calculated in high accuracy.

A ninth aspect of the present invention has an optical data processing device according to the eighth aspect of the present invention, wherein the three-dimensional model based on a stereophotographic image expands or contracts, and the optical data processing device further includes a scale adjusting unit for adjusting a scale of the three-dimensional model based on a stereophotographic image, so as to match each position of the first group of three-dimensional edges and each position of the second group of three-dimensional edges selected by the selecting unit, and a three-dimensional model integrating unit for integrating the three-dimensional model based on a stereophotographic image in which the scale is adjusted and other three-dimensional models, based on a combination of the first group of three-dimensional edges and the second group of three-dimensional edges selected by the selecting unit.

When the external orientation element is calculated by only the left and right photographic images using a relative orientation without using a target for orientation, the calculation is carried out in a coordinate system having no actual scale (for example, a unit of length is a relative value) and by using a baseline (a distance between left and right viewpoints) or a distance in a screen set to be an optional value. Therefore, the calculated coordinate system that defines an external orientation element is not isotropic and expands or contracts in a specific direction. According to the ninth aspect, two three-dimensional models are positioned by expanding the image measuring three-dimensional model (that is, by an affine transformation), while it is moved against the other three-dimensional model to be matched, so that the three-dimensional edges in which the correspondence relationship is required are overlapped. Here, when both of two three-dimensional models do not have an actual scale and expand and contract in the specific direction, the scale may be adjusted for one of the three-dimensional models or may be adjusted for both of the three-dimensional models.

For example, when the image measuring three-dimensional model does not have the actual scale, an actual scale is given to the image measuring three-dimensional model by matching with a laser point cloud three-dimensional model. Here, in this specification, a three-dimensional model that does not have an actual scale and expands and contracts in a specific direction is described as a relative model, and a three-dimensional model having an actual scale (for example, a laser point cloud three-dimensional model) is described as an absolute model.

A tenth aspect of the present invention has an optical data processing device according to any one of the first aspect to the ninth aspect of the present invention, wherein the first three-dimensional model is a three-dimensional model based on a three-dimensional point cloud position data obtained by a reflected light of a laser beam, and the second three-dimensional model is a three-dimensional model based on a stereophotographic image or the first three-dimensional model and the second three-dimensional model are three-dimensional models based on a stereophotographic image. In the case in which the second three-dimensional model is a three-dimensional model based on a stereophotographic image, the laser point cloud three-dimensional model and the image measuring three-dimensional model can be integrated. In contrast, in the case in which the first three-dimensional model and the second three-dimensional model are three-dimensional models based on a stereophotographic image, two image measuring three-dimensional models can be integrated.

An eleventh aspect of the present invention has an optical data processing device according to any one of the first aspect to the sixth aspect of the present invention, wherein the first three-dimensional model and the second three-dimensional model are three-dimensional models based on three-dimensional point cloud position data obtained by a reflected light of a laser beam. According to the eleventh aspect, two image measuring three-dimensional models can be integrated.

A twelfth aspect of the present invention is a system that can be applied to the first aspect of the present invention. That is, the twelfth aspect of the present invention has an optical data processing system including an extracting means for extracting multiple three-dimensional edges that extend in a specific direction from a first three-dimensional model, as a first group of three-dimensional edges, and for extracting multiple three-dimensional edges that extend in the specific direction from a second three-dimensional model, as a second group of three-dimensional edges, a similarity calculating means for calculating a similarity between each of the first group of three-dimensional edges and each of the second group of three-dimensional edges, and a selecting means for selecting one edge in the second group of three-dimensional edges corresponding to one edge in the first group of three-dimensional edges based on the similarity. The twelfth aspect of the present invention relates to a system in which each means is an individual device, it is separately arranged, and it is connected via a circuit.

A thirteenth aspect of the present invention has an optical data processing method including an extracting step for extracting multiple three-dimensional edges that extend in a specific direction from a first three-dimensional model, as a first group of three-dimensional edges, and for extracting multiple three-dimensional edges that extend in the specific direction from a second three-dimensional model, as a second group of three-dimensional edges, a similarity calculating step for calculating a similarity between each of the first group of three-dimensional edges and each of the second group of three-dimensional edges, and a selecting step for selecting one edge in the second group of three-dimensional edges corresponding to one edge in the first group of three-dimensional edges based on the similarity.

A fourteenth aspect of the present invention has an optical data processing program that is read and run by a computer, the program actuating the computer as the following means: an extracting means for extracting multiple three-dimensional edges that extend in a specific direction from a first three-dimensional model, as a first group of three-dimensional edges, and for extracting multiple three-dimensional edges that extend in the specific direction from a second three-dimensional model, as a second group of three-dimensional edges, a similarity calculating means for calculating a similarity between each of the first group of three-dimensional edges and each of the second group of three-dimensional edges, and a selecting means for selecting one edge in the second group of three-dimensional edges corresponding to one edge in the first group of three-dimensional edges based on the similarity.

According to the present invention, processing for specifying a correspondence relationship of feature points between two sets of optical data can be carried out with high precision and extremely efficiently.

MODE FOR CARRYING OUT THE INVENTION

1. First Embodiment

Assumption

Figure 1:
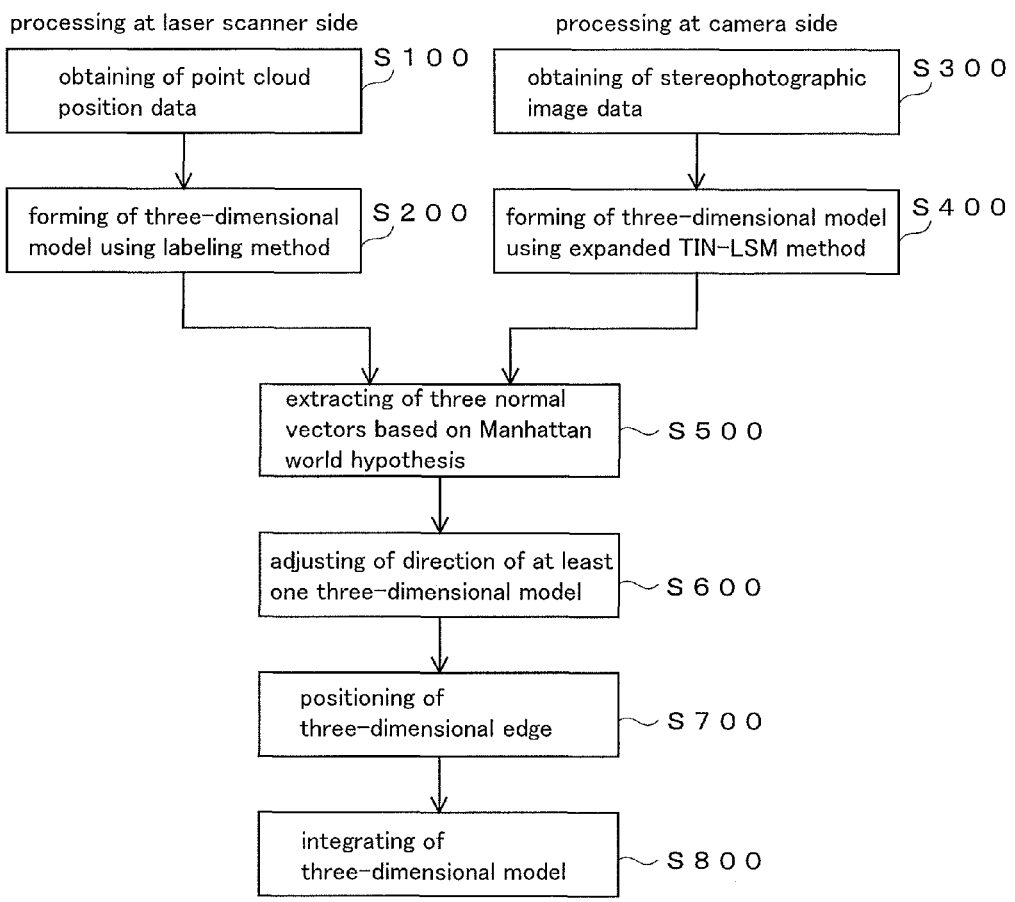
FIG. 1 is a flowchart showing an outline of a processing of an embodiment.

The main objects to be measured in the present embodiment are buildings.

Definition of Terms

In the following, the terms used in the specification will be explained.

Labels

The labels are identifiers for specifying a plane (or for distinguishing from other planes). The plane is a suitable plane for selecting as an object to be calculated, and it includes a flat surface, a curved surface having large curvature, and a curved surface having large curvature and small change at a curved position. In this specification, the plane and a non-plane are distinguished based on an allowable calculating amount that is mathematically understood (obtained from data) by calculation. The non-plane includes a corner, an edge part, a part having small curvature, and a part having large change at a curved portion. In these parts, a large amount of the mathematically understood (obtained from data) calculation is required, and burden on a calculation device and calculation time are increased. In this specification, in order to decrease the calculation time, planes in which the burden of a calculation device and the calculation time are increased are removed as a non-plane, so as to maximally decrease the number of objects for which calculation is performed.

Three-Dimensional Edge

The three-dimensional edge is an outline or a point for forming an outer shape of the object to be measured in which it is necessary to visually understand an appearance of the object to be measured. Specifically, a curved part or a part in which curvature is radically decreased corresponds to the three-dimensional edge. The three-dimensional edge is not only for a part of an outer shape but also for an edge part defining a convex part and an edge part defining a concave part (for example, a part having a groove structure). A three-dimensional model is formed by the three-dimensional edge, a so-called "diagram". According to this three-dimensional model, images in which an outer appearance of an object to be measured is easily understood can be displayed.

Three-Dimensional Model

The three-dimensional model is a diagram formed by the above three-dimensional edge. According to the three-dimensional model, images in which an appearance of an object to be measured is easily visually understood can be obtained. For example, the images of the three-dimensional model (figures of the three-dimensional model) can be used for CAD drawings, etc.

Point Cloud Position Data

In the point cloud position data, a two-dimensional image and three-dimensional coordinates are combined. That is, in the point cloud position data, data of a two-dimensional image of an object, multiple measured points corresponding to this two-dimensional image, and position of three-dimensional space (three-dimensional coordinate) of these multiple measured points are related. By the point cloud position data, three-dimensional surface configuration of the object to be measured can be duplicated by a series of points. That is, since each three-dimensional coordinate is obvious, relative positional relationships among the points can be understood; therefore, a processing revolving around the three-dimensional model image displayed and a processing switching to an image seen from a different viewpoint can be realized.

Flowchart of Processing

FIG. 1 shows an outline of a processing of the present embodiment. A program for processing a flowchart shown in FIG. 1 is stored in a suitable memory storage built in an optical data processing device 100 shown in FIG. 2, and it is processed by a CPU built in the optical data processing device 100. Here, the program for processing a flowchart shown in FIG. 1 may be stored in a suitable external storage and may be provided in the optical data processing device 100. This point is the same as in many programs for processing, which will be explained in the specification.

In the present embodiment, first high-density point cloud position data is obtained by a laser scanner (Terrestrial Laser Scanner (TLS)). In addition, an image data of a stereophotographic image is further obtained by stereophotographing a part in which occlusion is generated by the point cloud position data obtained from the laser scanner or a part in which it is necessary to compensate, using a digital camera. In this case, the part in which the point cloud position data is obtained and the stereophotographed part are partially overlapped, and multiple perpendicular edges (three-dimensional edges that extend in a perpendicular direction) are included in this overlapped part. Then, the three-dimensional edge is extracted from both the point cloud position data and the image data of the stereophotographic image, and each three-dimensional model is formed. Next, in order to match (correspond) between two three-dimensional modes, both data of the three-dimensional models are integrated. Thus, a three-dimensional model is formed, in which the part in which the occlusion is generated by the point cloud position data obtained from the laser scanner is compensated for.

In the following, the outline of the processing will be briefly explained with reference to FIG. 1. First a point cloud position data of an object to be measured is obtained using a laser scanner (Step S100). Next, a three-dimensional model of the object to be measured is formed by a labeling method, based on the point cloud position data obtained in the Step S100 (Step S200). As a production technique of the three-dimensional model of the object to be measured using the labeling method, for example, a technique described in International Patent Application Publication No. WO2011/162388 can be used. The Step S200 will be described below in detail.

On the other hand, the part in which the occlusion is generated by the point cloud position data obtained in the Step S100 (or the part in which it is necessary to compensate the data) is stereophotographed by a digital camera (Step S300). This photographing may be a technique for the photographing from two difficult viewpoints using a monocular digital camera, and it may use a special digital camera for stereophotographing. The image data of the stereophotographic image are obtained, and then, the three-dimensional model is formed by an expanded TIN-LSM method, based on the data (Step S400). The expanded TIN-LSM method in the Step S400 will be described below in detail.

Next, the three-dimensional model based on the point cloud position data obtained from the laser scanner and the three-dimensional model obtained from the stereophotographic image photographed by the digital camera are integrated. First, normal vectors are extracted from each of the three-dimensional model from the laser scanner and the three-dimensional model from the photographic image, respectively, based on a Manhattan world hypothesis (Step S500). The Manhattan world hypothesis is a hypothesis in which an artificial structure has three dominant axes that cross at right angles to each other and planes that constitute buildings are perpendicularly or horizontally arranged along the axes. Directions of the two three-dimensional models are determined by processing the Step S500. The Step S500 will be described below in detail.

Next, directions of two three-dimensional models are aligned by aligning the directions of the normal vectors determined in the Step S500 (Step S600). In this processing, the directions of the three axes in both the three-dimensional models are aligned by rotating one or both of the three-dimensional models.

Next, a correspondence relationship between the three-dimensional models is obtained by positioning three-dimensional edges that constitute the two three-dimensional models, respectively (Step S700). Then, an integrated three-dimensional model is obtained by integrating a three-dimensional model based on point cloud position data obtained from a laser scanner and a three-dimensional model obtained from an image photographed by a camera, based on the correspondence relationship obtained in the Step S700 (Step S800).

Optical Data Processing Device

Figure 2:
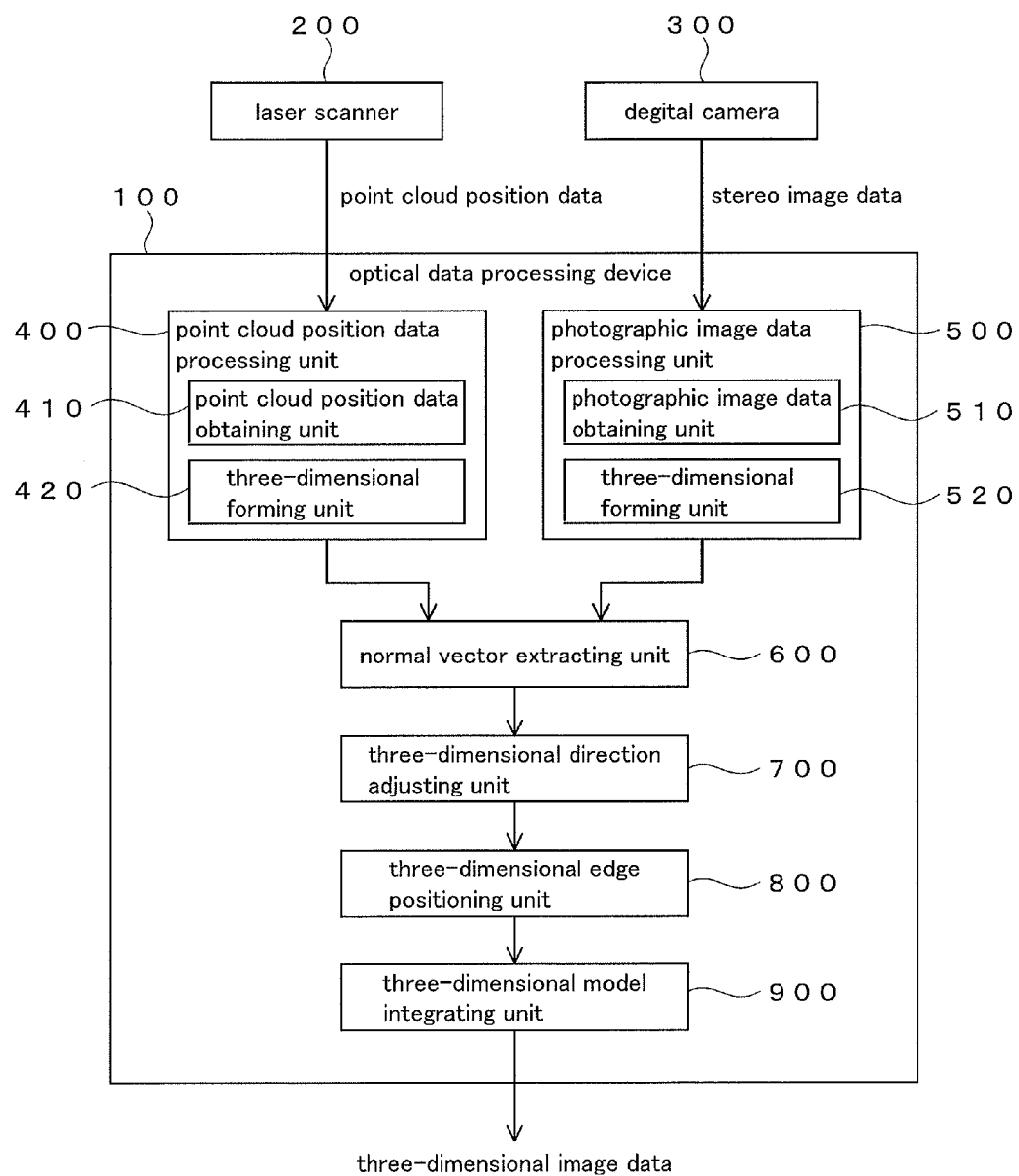
FIG. 2 is a block diagram showing an optical data processing device of an embodiment.

In the following, an example of an optical data processing device for carrying out the processing shown in FIG. 1 will be explained. FIG. 2 shows an optical data processing device 100. The optical data processing device 100 is constructed like software in a personal computer. That is, a personal computer in which a special software for processing using the present invention is installed functions as the optical data processing device 100 shown in FIG. 1. This program may be installed in the personal computer, or it may be stored in a server or in a suitable storage, so as to be provided therefrom.

The personal computer used includes an input unit such as a keyboard, touch panel display or the like, a display unit such as a liquid crystal display or the like, a GUI (graphical user interface) function unit in which the input unit and the display unit are integrated, an operating device such as a CPU or the like, a semiconductor memory, a hard disk storage unit, a disk storage driving unit in which information can be handled with the storage such as an optical disk or the like, an interface unit in which information can be handled with a portable storage such as a USB memory or the like, and a communication interface unit in which wireless or wired communication is performed. It should be noted that a computer configuration such as of the notebook type, portable type and desktop type may be mentioned; however, the configuration of the present invention is not limited in particular. In addition to using a general personal computer, a part or an entirety of the optical data processing device 100 can be constructed by dedicated hardware which is constructed by using PLD (Programmable Logic Device) or the like such as ASIC (Application Specific Integrated Circuit) or FPGA (Field Programmable Gate Array).

The optical data processing device 100 is connected or is connectable with a laser scanner 200 and a digital camera 300. The laser scanner 200 irradiates laser light and scans with respect to an object to be measured and detects reflected light therefrom. Installation position of the laser scanner 200 is accurately set in advance, and three-dimensional coordinates of an irradiation point of the laser light is calculated based on distance to the irradiation point calculated from an irradiation direction of the laser light and flight time of the laser light. The three-dimensional coordinate of a large number of the irradiation points (tens of thousands of points to hundreds of millions of points) is obtained as a point cloud position data by carrying out this processing while irradiation position of the irradiation point is slightly shifted. This point cloud position data is input to the optical data processing device 100. The digital camera 300 photographs stereo images used for three-dimensional photogrammetry (stereophotogrammetry), and data of the images is input to the optical data processing device 100. In the present embodiment, the stereophotographic image is photographed from two difficult viewpoints using one digital camera. Of course, the stereophotographic image may be taken using a camera for stereophotography having two optical systems.

The optical data processing device 100 has a point cloud position data processing unit 400, a photographic image data processing unit 500, a normal vector extracting unit 600, a three-dimensional edge positioning unit 800, and a three-dimensional model integrating unit 900. The point cloud position data processing unit 400 forms a three-dimensional model of an object to be measured based on the point cloud position data obtained from the laser scanner 200. The point cloud position data processing unit 400 has a point cloud position data obtaining unit 410 and a three-dimensional model forming unit 420. The point cloud position data obtaining unit 410 obtains a point cloud position data of the object to be measured which is transmitted from the laser scanner 200 (Step S100 in FIG. 1). The three-dimensional model forming unit 420 forms a three-dimensional model of the object to be measured which is measured by the laser scanner 200, based on the point cloud position data obtained by the point cloud position data obtaining unit 410 (Step S200 in FIG. 1). The three-dimensional model obtaining unit 420 will be described below in detail.

The photographic image data processing unit 500 forms a three-dimensional model of the object to be measured based on the image data of the stereophotographic image photographed by the digital camera 300. The stereophotographic image is constituted by a left photographic image and a right photographic image that shift viewpoints in left and right directions, respectively. A left and right deflection corrected image (an image in which an epipolar line of left and right photographic images is rearranged on the same horizontal line) is formed from the stereophotographic image using an external orientation element. The left and right deflection corrected images are aligned in a left and right direction. Then, the left deflection corrected image is selectively viewed by the left eye using a deflection glass, etc., and the right deflection corrected image is selectively viewed by the right eye. Therefore, a stereoscopic view can be provided.

The photographic image data processing unit 500 has a photographic image data obtaining unit 510 and a three-dimensional model forming unit 520. The photographic image data obtaining unit 510 obtains the image data of the stereophotographic image of the object to be measured which is transmitted from the digital camera 300 (Step S300 in FIG. 1). The three-dimensional model forming unit 520 forms a three-dimensional model of the object to be measured photographed by the digital camera 300, based on the image data of the stereophotographic image obtained by the photographic image data obtaining unit 510 (Step S400 in FIG. 1). The three-dimensional model obtaining unit 520 will be described below in detail.

The normal vector extracting unit 600 extracts normal vectors in three directions (that is, XYZ axes that cross at right angles to each other) with respect to two three-dimensional models formed by the three-dimensional model forming units 420 and 520, based on the Manhattan world hypothesis. The three-dimensional model direction adjusting unit 700 adjusts one or both directions of the two three-dimensional models formed by the three-dimensional model forming units 420 and 520, based on each normal vector of the three-dimensional model extracted by the normal vector extracting unit 600, and aligns the directions. The three-dimensional edge positioning unit 800 determines the correspondence of three-dimensional edges between the two three-dimensional models in which the directions are adjusted by the three-dimensional model direction adjusting unit 700. The three-dimensional model integrating unit 900 forms the three-dimensional model in which the three-dimensional model based on the point cloud position data measured by the laser scanner 200 and the three-dimensional model based on the image data of the stereo image photographed by the digital camera 300 are integrated.

The three-dimensional model based on the photographic image integrated into the three-dimensional model based on the point cloud position data measured by the laser scanner 200 is not limited, and it may be two or more. For example, the three-dimensional model based on the point cloud position data measured by the laser scanner 200 includes multiple occlusions, and the multiple occlusions cannot be photographed by single stereophotographing using the digital camera 300. In this case, the multiple occlusions are individually stereophotographed from different viewpoints, the multiple image data of the stereophotographic images from each viewpoint are processed in the photographic image data processing unit 500, and a three-dimensional model based on the stereophotographic image from each viewpoint is formed. Then, a first integrated three-dimensional model is formed by integrating the three-dimensional model based on the point cloud position data and the three-dimensional model based on the stereophotographic image, and next, a second integration three-dimensional model is formed by integrating the first integrated three-dimensional model and a three-dimensional model based on the next stereophotographic image. The occlusions are successively dissolved by repeating such processing, and therefore, the degree of perfection of the three-dimensional model is increased.

Three-Dimensional Model Forming from Point Cloud Position Data

Figure 3:
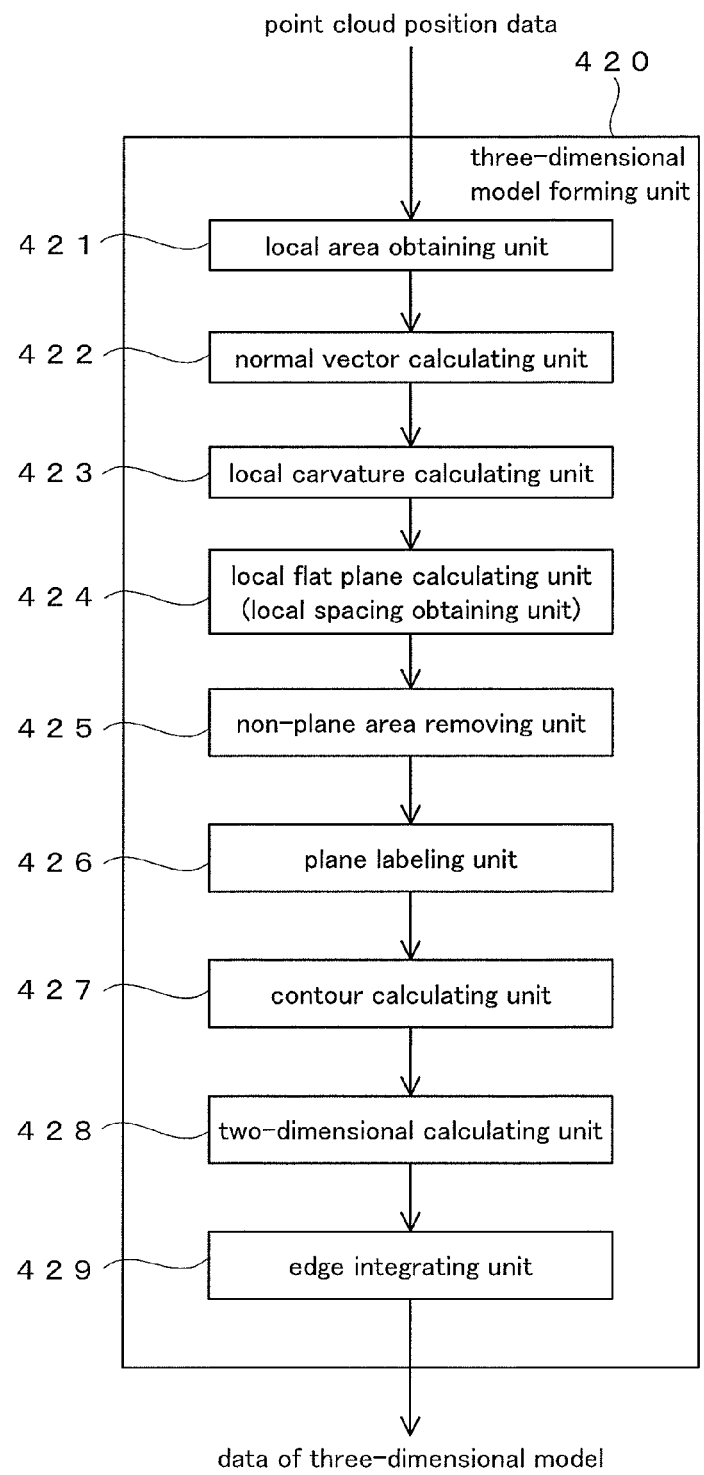
FIG. 3 is a block diagram of a three-dimensional model forming unit for processing based on point cloud position data.

A three-dimensional model forming unit 420 shown in FIG. 2 and an operation thereof (Step S200 in FIG. 1) will be explained in detail. FIG. 3 shows a block diagram of the three-dimensional model forming unit 420. The three-dimensional model forming unit 420 is equipped with a local area obtaining unit 421 for obtaining a local area, a normal vector calculating unit 422 for calculating a normal vector of a local area, a local curvature calculating unit 423 for calculating a local curvature of a local area, a local flat plane calculating unit 424 for a calculating local flat plane which fits to the local area, a non-plane area removing unit 425, a plane labeling unit 426, a contour calculating unit 427, a two-dimensional edge calculating unit 428, and an edge integrating unit 429.

The local area obtaining unit 421 obtains a square area (grid-like area) of approximately 3 to 7 pixels on a side, which has a target point at the center, as a local area, based on the point cloud position data. The normal vector calculating unit 422 calculates a normal vector of each point in the above local area obtained by the local area obtaining unit 421. In the calculation of the normal vector, the point cloud position data in the local area is used, and a normal vector of each point is calculated. This calculation is performed on the entirety of the point cloud data. That is, the point cloud data is divided into numerous local areas, and a normal vector of each point in each of the local areas is calculated.

The local curvature calculating unit 423 calculates a variation (local curvature) of the normal vectors in the local area. In this case, in a target local area, an average (mNVx, mNVy, mNVz) of intensity values (NVx, NVy, NVz) of the three axis components of each normal vector is calculated. In addition, a standard deviation (StdNVx, StdNVy, StdNVz) is calculated. Then, a square-root of a sum of squares of the standard deviation is calculated as a local curvature (crv) (see the following Formula 1).

$$\text{Local curvature} = (\text{StdNV}x^2 + \text{StdNV}y^2 + \text{StdNV}z^2)^{1/2} \quad \text{Formula 1}$$

The local flat plane calculating unit 424 calculates a local flat plane (a local space) fitted (approximated) to the local area. In this calculation, an equation of a local flat plane is obtained from three-dimensional coordinates of each point in a target local area. The local flat plane is made so as to fit to the target local area. In this case, the equation of the local flat plane that fits to the target local area is obtained by the least-squares method. Specifically, multiple equations of different flat planes are obtained and are compared, whereby the equation of the local flat plane that fits to the target local area is obtained. When the target local area is a flat plane, a local flat plane coincides with the local area.

The calculation is repeated so that it is performed on the entirety of the point cloud position data by sequentially forming a local area, whereby normal vectors, a local flat plane, and a local curvature, of each of the local areas are obtained.

The non-plane area removing unit 425 removes points of non-plane areas based on the normal vectors, the local flat plane, and the local curvature, of each of the local areas. That is, in order to extract planes (flat planes and curved planes), portions (non-plane areas), which can be preliminarily identified as non-planes, are removed. The non-plane areas are areas other than the flat planes and the curved planes, but there may be cases in which curved planes with high curvatures are included according to threshold values in the following methods (1) to (3).

The removal of the non-plane areas is performed by at least one of the following three methods. In this embodiment, evaluations according to the following methods (1) to (3) are performed on all of the local areas. When the local area is identified as a non-plane area by at least one of the three methods, the local area is extracted as a local area that forms a non-plane area. Then, point cloud position data relating to points that form the extracted non-plane area are removed.

(1) Portion with High Local Curvature

The above local curvature is compared with a predetermined threshold value, and a local area having a local curvature that exceeds the threshold value is identified as a non-plane area. The local curvature indicates variation of normal vectors of the target point and surrounding points. Therefore, the local curvature is small with respect to planes (flat planes and curved planes with small curvatures), whereas the local curvature is large with respect to areas other than the planes (non-planes). Accordingly, when the local curvature is greater than the predetermined threshold value, the target local area is identified as a non-plane area.

(2) Fitting Accuracy of Local Flat Plane

Distances between each point in a target local area and a corresponding local flat plane are calculated. When an average of these distances is greater than a predetermined threshold value, the target local area is identified as a non-plane area. That is, when a target local area differs from the shape of a flat plane, and the difference is greater, the distances between each point in the target local area and the corresponding local flat plane are greater. By using this function, degree of non-planarity of a target local area is evaluated.

(3) Check of Coplanarity

The directions of local flat planes that correspond to adjacent local areas are compared. When the difference in the directions of the local flat planes exceeds a threshold value, the adjacent local areas are identified as non-plane areas. Specifically, two local flat planes that fit to two target local areas, respectively, have a normal vector and a connecting vector that connects center points in the local flat planes. When inner products of each of the normal vectors and the connecting vector are zero, both of the local flat planes are determined to exist in the same plane. When the inner products are greater, the two local flat planes are more separated and are not in the same plane.

A local area that is identified as a non-plane area by at least one of the three methods (1) to (3) is extracted as a local area that forms a non-plane area. Then, point cloud position data relating to points that form the extracted local area are removed from point cloud position data to be calculated. As described above, non-plane areas are removed. Thus, point cloud position data of non-plane areas are removed from the point cloud position data by the non-plane area removing unit 425. Since the removed point cloud position data may be used in later steps, these point cloud position data may be stored in an appropriate storage area or may be set so as to be identified from the remaining point cloud position data, in order to make them available later.

Next, the function of the plane labeling unit 426 will be described. The plane labeling unit 426 performs plane labeling on the point cloud position data, in which the point cloud position data of the non-plane areas are removed by the non-plane area removing unit 425, based on continuity of normal vectors. Specifically, when an angle difference of normal vectors of a target point and an adjacent point is not more than a predetermined threshold value, identical labels are added to these points. By repeating this processing, identical labels are added to each of connected flat planes and connected curved planes with small curvatures, whereby each of the connected flat planes and the connected curved planes are made identifiable as one plane. After the plane labeling is performed, whether the label (plane) is a flat plane or a curved plane with a small curvature is evaluated by using the angular difference of the normal vectors and standard deviations of the three axial components of the normal vectors. Then, identifying data for identifying the result of this evaluation are linked to each of the labels.

Labels (planes) with small areas are removed as noise. The removal of noise may be performed at the same time as the plane labeling. In this case, while the plane labeling is performed, the number of the identical labels (number of points forming the identical label) is counted, and labels that have points at not more than a predetermined number are cancelled. Then, a label of the nearest plane is added to the points with no label at this time. Accordingly, the labeled planes are expanded.

That is, an equation of a labeled plane is obtained, and a distance between the labeled plane and a point with no label is calculated. When there are multiple labels (planes) around the point with no label, a label having a smallest distance from the point is selected. When points with no label still exist, each of the threshold values in the removal of non-plane areas, the removal of noise, and the extension of label, is changed, and related processing is performed again. For example, by increasing the threshold value of the local curvature in the removal of non-plane areas, fewer points are extracted as non-planes. In another case, by increasing the threshold value of the distance between the point with no label and the nearest plane in the extension of label, labels are added to more of the points with no label.

When planes have different labels but are in the same planes, the labels of the planes are integrated. That is, identical labels are added to planes that have the same position or the same direction, even if the planes are not continuous planes. Specifically, by comparing the positions and the directions of the normal vectors of each plane, discontinuous same planes are extracted, and the labels thereof are integrated into one of the labels thereof. These are the function of the plane labeling unit 426. According to the function of the plane labeling unit 426, the amount of data to be dealt with is compacted, whereby the point cloud position data is processed at higher speed. In addition, the amount of necessary memory is decreased. Moreover, point cloud data of passersby and passing vehicles during the taking of point cloud position data of an object are removed as noise.

The contour calculating unit 427 calculates (estimates) a contour based on point cloud position data of adjacent planes. A specific calculation method will be described hereinafter. The contour calculating unit 427 obtains line intersection of adjacent planes that hold non-plane areas therebetween, and carries out the processing of it as a contour. As another calculation method of the contour, a method in which local flat planes are fitted to the non-plane areas between adjacent planes, multiple local flat planes are connected, and therefore, the non-plane areas are approximated by the multiple local flat planes, can also be used. This is the reason why a polyhedron formed by the multiple local flat planes approximates the non-plane area. In this case, the local flat planes are connected from adjacent planes, and line intersection of finally adjacent local flat planes is calculated as a contour. The image of the contour of the object becomes clear by calculating the contour.

Next, the two-dimensional edge calculating unit 428 will be explained. In the following, an example of processing carried out in the two-dimensional edge calculating unit 428 will be explained. First, by a publicly known edge extracting operator such as Laplacian, Prewitt, Sobel, or Canny, provisional edges are extracted from within areas of two-dimensional images corresponding to the planes segmented (divided) based on intensity distribution of light reflected from the object. That is, since the two-dimensional edge is recognized by difference of intensity in a plane, the difference of the intensity is extracted from information of the strength of the reflected light, and a contour of the intensity is extracted as a provisional edge by setting a threshold value to the extracting condition. Next, a height (z value) of a three-dimensional coordinate of a point forming the provisional edge is compared with that of a point forming a contour in the vicinity of the provisional edge. When this difference is not more than a predetermined threshold value, the provisional edge is extracted as a two-dimensional edge. That is, whether the point forming the provisional edge extracted from the two-dimensional image is on the segmented plane or not is evaluated, and when it is on the segmented plane, the provisional edge is a two-dimensional edge.

The edge integrating unit 429 integrates contour calculated by the contour calculating unit 427 and the two-dimensional edge calculated by the two-dimensional edge calculating unit 428. As described above, the three-dimensional edge based on the point cloud position data is extracted. Lines for forming appearance of the object to be measured in recognizing the object are extracted as a three-dimensional edge by this edge extraction. The appearance of the object to be measured is formed by this three-dimensional edge, and a three-dimensional model is formed.

Three-Dimensional Model Forming from Photographic Image Data

A three-dimensional model forming unit 520 of the photographic image data processing unit 500 and an operation thereof (Step S400 in FIG. 1) will be explained in detail. In the following, an example in which a left photographic image and a right photographic image are taken while changing positions using one camera will be explained. Of course, the left photographic image and the right photographic image may be simultaneously taken using two cameras, one at the left position and one at the right position.

Figure 4:
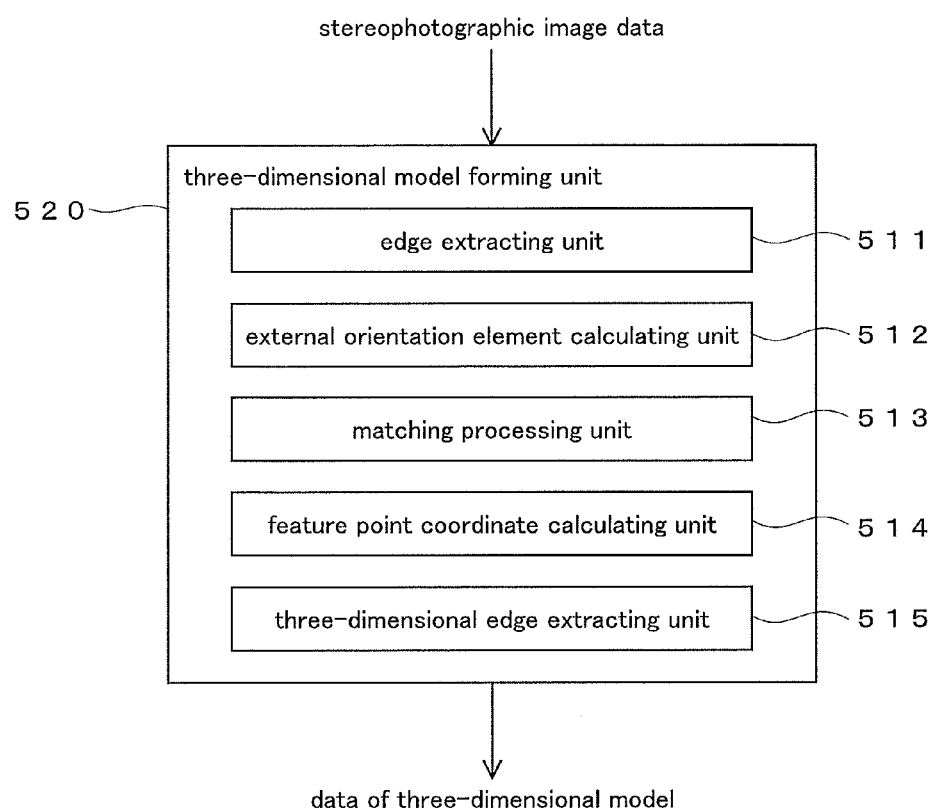
FIG. 4 is a block diagram of a three-dimensional model forming unit for processing based on stereophotographic images.

FIG. 4 shows a block diagram of the three-dimensional model forming unit 520 (see FIG. 2). An image data of the left photographic image and an image data of the right photographic image that form a stereo image from the digital camera 300 are input to the three-dimensional model forming unit 520. The three-dimensional model forming unit 520 has an edge extracting unit 511, an external orientation element calculating unit 512, a matching processing unit 513, a feature point coordinate calculating unit 514, and a three-dimensional edge extracting unit 515.

Edge Extracting Unit

The edge extracting unit 511 extracts an edge of the object to be measured from each of the right photographic image and the left photographic image. Here, since the left photographic image and the right photographic image are plane images, an edge to be extracted is a part of a two-dimensional contour that constitutes the object to be measured in the image. The edge in the edge extracting unit 511 is extracted as described below. First, the images are thinned by a NMS (non-maximum suppression) of a direction of edge strength using a Sobel filter, and then, a threshold value of an edge strength is set. Here, when a differential of an x axial direction strength is set to be fx and a differential of a y axial direction strength is set to be fy, an edge strength I is calculated as shown in Formula 2.

$$I=\sqrt{(fx^2+fy^2)}$$ Formula 2

Figure 5:
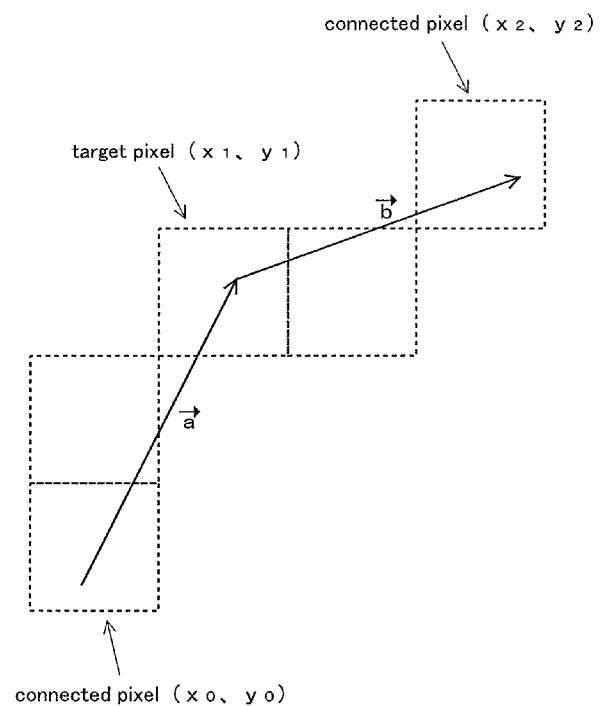
FIG. 5 is a schematic view showing a principle for extracting an edge.

Then, corners (inflection points) of straight lines in the left and right photographic images are detected, and endpoints of a residual line segment in which the corners are removed are extracted as a straight line. FIG. 5 shows a principle for extracting the edges. In this case, whether or not an angle θ (see Formula 3) between a vector a and a vector b defined by connected pixels (x0, y0) and (x2, y2) which separate two pixels from a target pixel (x1,y1), respectively, is not less than a specific threshold value (in this case, 30 degrees) is evaluated. When the angle is the threshold value or greater, a part of the endpoint in which a direction of the vector changes is extracted as a corner point.

$$\cos\theta = \frac{\langle a, b \rangle}{\|a\| \cdot \|b\|} = \frac{\{(x_1-x_0)(x_2-x_1)+(y_1-y_0)(y_2-y_1)\}}{\sqrt{(\{(x_1-x_0)^2+(y_1-y_0)^2\} \cdot \{(x_2-x_1)^2+(y_2-y_1)^2\}}}$$ Formula 3

Next, whether the edge is appropriately adopted or not is evaluated. In this processing, first an accumulation value of the strength I of each pixel in a length L of the straight line extracted is set to be an evaluation function, and whether this evaluation function exceeds a predetermined threshold value or not is evaluated. This evaluation condition is shown by Formula 4.

$$k \cdot \max I < \Sigma_{i=1}^{L} I(i)$$ Formula 4

Here, the left side of Formula 4 is a threshold value, and the value is defined as k times the maximum strength I. This threshold value is a value that is experimentally obtained. For example, the value k is 5. The straight line that passed the above evaluation is adopted as an edge. This edge is described by coordinates of a start point and an end point (that is, endpoints of both edges). According to this method, an edge that generates noise having low strength is removed, and an edge that defines the object to be measured can be efficiently extracted. In addition, the calculation time can be decreased, since calculation is reduced.

External Orientation Element Calculating Unit

The external orientation element calculating unit 512 automatically calculates an external orientation element using a relative orientation method, based on the stereophotographic image. That is, the correspondence relationship of the left and right photographic images is calculated, and using this calculated result, a direction and a position of a camera in photographing the left and right photographic images (relative direction and position of the camera to an object to be photographed) are calculated by the relative orientation method. The relative orientation method is a method for calculating a relative external orientation element, even if there is no known point. As a flow of the processing, first a corresponding feature points are found in the left photographic image and the right photographic image. Then, a corresponding point for orientating is obtained from the feature point which corresponds in the left and right photographic images, and the external orientation element of the left photographic image and the right photographic image is obtained by the relative orientation method using this corresponding point for orientating.

In the following, a calculating procedure of the external orientation element will be explained step by step. A parallax amount that is a position difference in the left photographic image and the right photographic image on a first corresponding point is estimated as an estimation parallax amount. In this processing, first the edge (two-dimensional edge) is extracted from each of the left and right photographic images by a function of the edge extracting unit 511. In this extraction of the edge, a differential filter such as Moravec, Laplacian, Sobel, etc., is used. Here, an extending direction of the extracted edge is not limited in particular.

Next, with respect to reduced images, stereo matching of the left and right images is carried out by a normalization cross correlation method using a vicinity of the endpoint of the extracted edge as a template. The reduced image is used in order to speed up the processing. The correspondence relationship between the left and right photographic images with respect to the endpoint of the extracted edge is searched for by this processing. Here, when coordinates of the corresponding points (an end portion of the edge) in which the matching is carried out in the left and right photographic images are set to be (x, y) and (xe, ye) and a value point in which (x, y) is transformed by projection is set to be (x', y'), the relationship between (x, y) and (x', y') is defined by Formula 5.

$$x' = \frac{b_1 x + b_2 y + b_3}{b_7 x + b_8 y + 1}, \; y' = \frac{b_4 x + b_5 y + b_6}{b_7 x + b_8 y + 1}$$ Formula 5

Parameters b1 to b8 of the projection transformation shown in Formula 5 are calculated by an eight points method using RANSAC processing. In this case, the unknown parameters b1 to b8 are estimated based on an assumption of "buildings in photographic images are formed by planes and edges which are vertical components". The RANSAC processing is a method for estimating the unknown parameters by the following steps.

(1) N data are selected from data in which total number thereof is U at random.
(2) Parameters are calculated from the selected n data (the number of the selected data is proportional to the number of the parameters to be calculated).
(3) An error between observed data and the parameters calculated in Step (2) is calculated by applying data in which n data are subtracted from total data to an equation.
(4) When the error is within an allowable range, the parameters are voted.
(5) Steps (1) to (4) are repeated, and a parameter in which the number of votes is the maximum is appointed on trial as a formal parameter.
(6) All data are applied to the equation again using the formal parameter, and the data in which the error is within an allowable range are extracted.
(7) The parameter is calculated again based on the extracted data.
(8) The calculated parameter is set to be the most suitable parameter to this data.

The estimation parallax amount P is defined by Formula 6 that shows a Gibbs distribution. Here, the smaller the residual J ($\Delta p/\Delta q$), the higher the accuracy of the feature point, and the highest ranking ten pieces of data in which the estimation parallax amount P is approximately 1 are selected as an estimation parallax amount. In this case, a coefficient s is set to be 0.05.

$$P=\exp(-sJ(\Delta p/\Delta q))\Delta p=x_e-x' \Delta q=y_e-y'$$ Formula 6

After the estimation parallax amount P is calculated, an endpoint which constitutes a vertical edge (an edge that extends in a perpendicular direction) is selected from endpoints of edges in which the correspondence relationship is found between left and right perspective images, and therefore, an estimation parallax amount P in a part containing this endpoint is obtained. As a result, lateral deformation can be prevented, and matching can be accurately carried out on an epipolar line.

Next, feature points are re-extracted on unmagnified images of the left and right photographic images. Here, corresponding points for orientating are obtained from the above re-extracted feature points. In this extraction of the feature points, a differential filter such as Moravec, Laplacian, Sobel, etc., is used.

Next, with respect to the feature points re-extracted from the left and right photographic image, the stereo matching between the left and right photographic images is carried out based on the estimation parallax amount P shown in Formula 6. This processing is carried out with respect to the feature points in the vicinity of the endpoints of the edges in which the estimation parallax amount is calculated. In this processing, feature points to be searched for in the left and right photographic images are assumed to be within an estimated parallax, and correspondence relationship is searched for between multiple feature points in the left and right photographic images. This processing is carried out using an LSM method (a least square correlation method) in which projection can be prevented from distorting and subpixels can be detected.

Next, the highest ranking six or more points in which matching accuracy is high are selected from the feature points in which the correspondence relationship in the left and right photographic images is obtained, as a corresponding point for orientating, by an eight points method using RANSAC processing. Then, relative orientation is carried out using the corresponding points for orientating selected in the left and right photographic images. The relative orientation is a method in which an eternal orientation element is obtained by the six or more corresponding points in two sheets of the left and right photographic images. In this case, a baseline length (a distance between a camera for photographing the left photographic image and a camera for photographing the right photographic image) is assumed to be a specific value (for example, 1 m, which can be easily calculated), and the calculation is carried out. Alternatively, a distance between two feature points to be focused on is assumed to be a specific value (for example, 1 m, which can be easily calculated), and the calculation is carried out.

Figure 6:
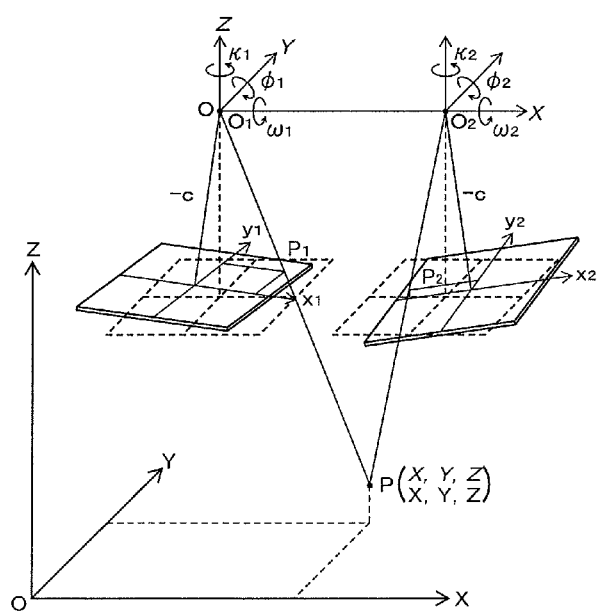
FIG. 6 is an explanatory view explaining a relative orientation.

Next, calculation of an external orientation element by a relative orientation method will be explained. The relative orientation method is a method for calculating a relative external orientation element, even if there is no known point. When there is a known point, the absolute coordinate can be obtained by carrying out an absolute orientation. FIG. 6 is an explanatory view for explaining the relative orientation. The relative orientation is a method in which an eternal orientation element is obtained by the six or more corresponding points in two sheets of the left and right photographic images. The relative orientation uses a coplanar condition in which it is necessary to align two rays that connect projected centers $O_1$ and $O_2$ with a reference point P on the same plane. The following Formula 7 shows a coplanar conditional formula.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \quad \text{Formula 7}$$

$X_{01}, Y_{01},$ $Z_{01}$: Coordinates of projected center of the left image $X_{02}, Y_{02}, Z_{02}$: Coordinates of projected center of the right image $X_1, Y_1, Z_1$: Left image coordinates $X_2, Y_2, Z_2$: Right image coordinates As shown in FIG. 6, an origin point of a model coordinate system is assumed to be a projected center $O_1$ on the left image, and a line connecting to a projected center $O_2$ on the right image is assumed to be an X-axis. In scale, the length of the baseline is assumed to be a part length. In this case, five parameters are obtained: a rotary angle $\kappa_1$ of the Z-axis and a rotary angle $\varphi_1$ of the Y-axis of the left camera, a rotary angle $\kappa_2$ the Z-axis, a rotary angle $\varphi_2$ of the Y-axis, and a rotary angle $\omega_2$ of the X-axis of the right camera. Since the rotary angle $\omega_1$ of the X-axis of the left camera is zero, it need not be taken into consideration. Under these conditions, the coplanar conditional formula of the Formula 7 is converted into the Formula 8, and respective parameters are calculated by solving this Formula 8.

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \quad \text{Formula 8}$$

$\kappa_1$: Left camera's rotary angle about Z-axis $\phi_1$: Left camera's rotary angle about Y-axis $\kappa_2$: Right camera's rotary angle about Z-axis $\phi_2$: Right camera's rotary angle about Y-axis $\omega_2$: Right camera's rotary angle about X-axis Here, the following relationship for converting coordinates shown in Formula 9 is formed between the model coordinate system XYZ and the camera coordinate system xyz.

$$\begin{pmatrix} X_1 \\ Y_1 \\ Z_1 \end{pmatrix} = \quad \text{Formula 9}$$

$$\begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} = 0$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix}$$

$$\begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Unknown parameters (exterior orientation parameters) are calculated by using the above-described formulas according to the following steps under a condition in which a distance between positions for photographing the left and right photographic images or a distance between feature points at a different position is assumed to be a suitable value.

(1) Initial approximate values of the unknown parameters ($\kappa 1$, $\varphi 1$, $\kappa 2$, $\varphi 2$, $\omega 2$) are assumed to be zero as a rule.

(2) The coplanar conditional formula of Equation 8 is expanded by using Taylor's formula about the approximate values, and is linearized. The differential coefficients are calculated from the Formula 9, and observation formulas are made.

(3) A compensation amount for the approximate values is calculated by the least-squares method.

(4) The approximate values are compensated.

(5) The above steps 1 to 4 are repeated until the result converges, using compensated approximate values.

The external orientation element of the camera 300 (position and attitude of the camera 300) in photographing the right image and photographing the left image is obtained by the above relative orientation. The coordinate system, which describes the external orientation element obtained here, is a local coordinate system in which standard absolute value is not known. At this time, the correlation relationship with the point cloud position data obtained from the laser scanner 200 is not clear and does not have an actual scale (information about actual dimensions). Since a distance between photographing sites of the left and right photographic images or a distance between feature points at different positions is assumed to be a suitable value and the calculation is carried out, this coordinate system is not isotropic and the above value expands or contracts in a direction which connects two assumed points.

A bundle adjustment is carried out after the external orientation element in the left and right photographic image is obtained. In the bundle adjustment, an observation equation is formed at every one light flux of each image, based on a collinear condition in which it is necessary to align light flux (bundle) which connects three points of a feature point of the object to be measured, a point on a frame image, and a projected center on the same line, a simultaneous adjustment is carried out by a least-squares method, and therefore, each parameter is optimized.

As a method for calculating an external orientation element, a method 1 is one in which left and right photographic images in which a reference point is previously positioned are photographed, and an external orientation element of a camera is calculated by a three-point method, based on three-dimensional coordinates of the reference point and image coordinate in the left and right photographic images, and a method 2 is one in which a scale in which two points are predetermined so as to have a specific positional relationship is prepared, and an external orientation element of left and right photographic images is calculated based on photographic images of this scale, or the like, can be used in addition to the above method.

Matching Processing Unit

In the above calculation of the external orientation element, the corresponding points for orientating are calculated in the left and right photographic images. However, a three-dimensional model cannot be formed by the corresponding points for orientating, since the density of the points is too low. Therefore, a matching processing unit 513 shown in FIG. 4 specifies the correspondence relationship of feature points of the left and right photographic images using an external orientation calculated by an external orientation element calculating unit 512, in order to form the three-dimensional model based on the left and right photographic images.

First, a deflection corrected image (an image in which an epipolar line of left and right photographic images is rearranged on the same horizontal line) is formed using the external orientation element calculated by the external orientation element calculating unit. The deflection corrected image is an image in which the left and right photographic images are aligned on the epipolar line (on a Z axial line (on an axial line in a depth direction of the object to be photographed) of a model coordinate system), and it is a photographic image which is not inclined relative to the model coordinate system. For example, the left and right deflection corrected images are aligned in a left and right direction. Then, the left deflection corrected image is selectively viewed by a left eye using a deflection glass, etc., and the right deflection corrected image is selectively viewed by a right eye. Therefore, a stereoscopic view can be provided.

Figure 7:
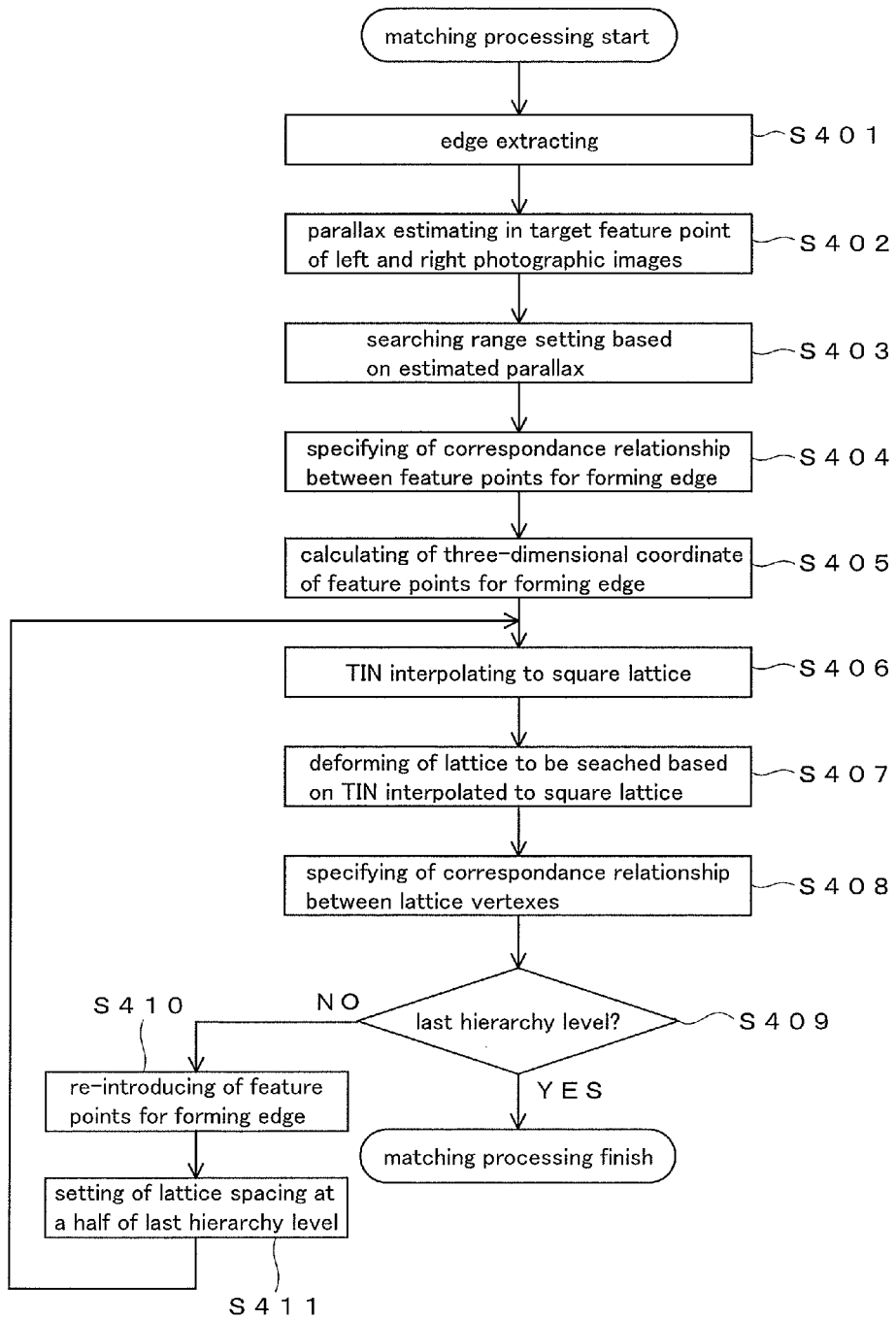
FIG. 7 is a flowchart showing a flow of a matching processing.
Figure 8:
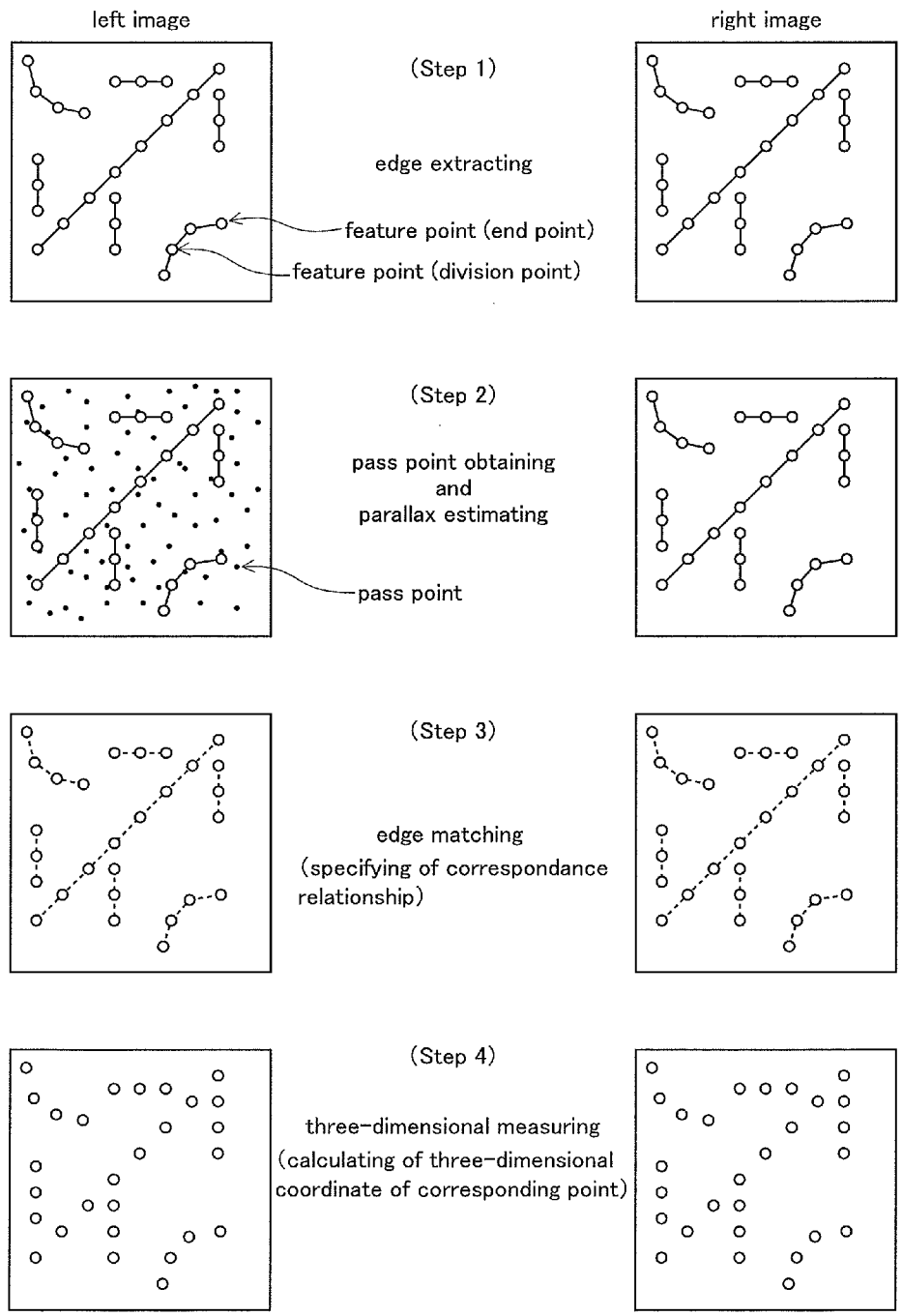
FIG. 8 is a schematic view of left and right photographic images showing stepwise processing states.
Figure 9:
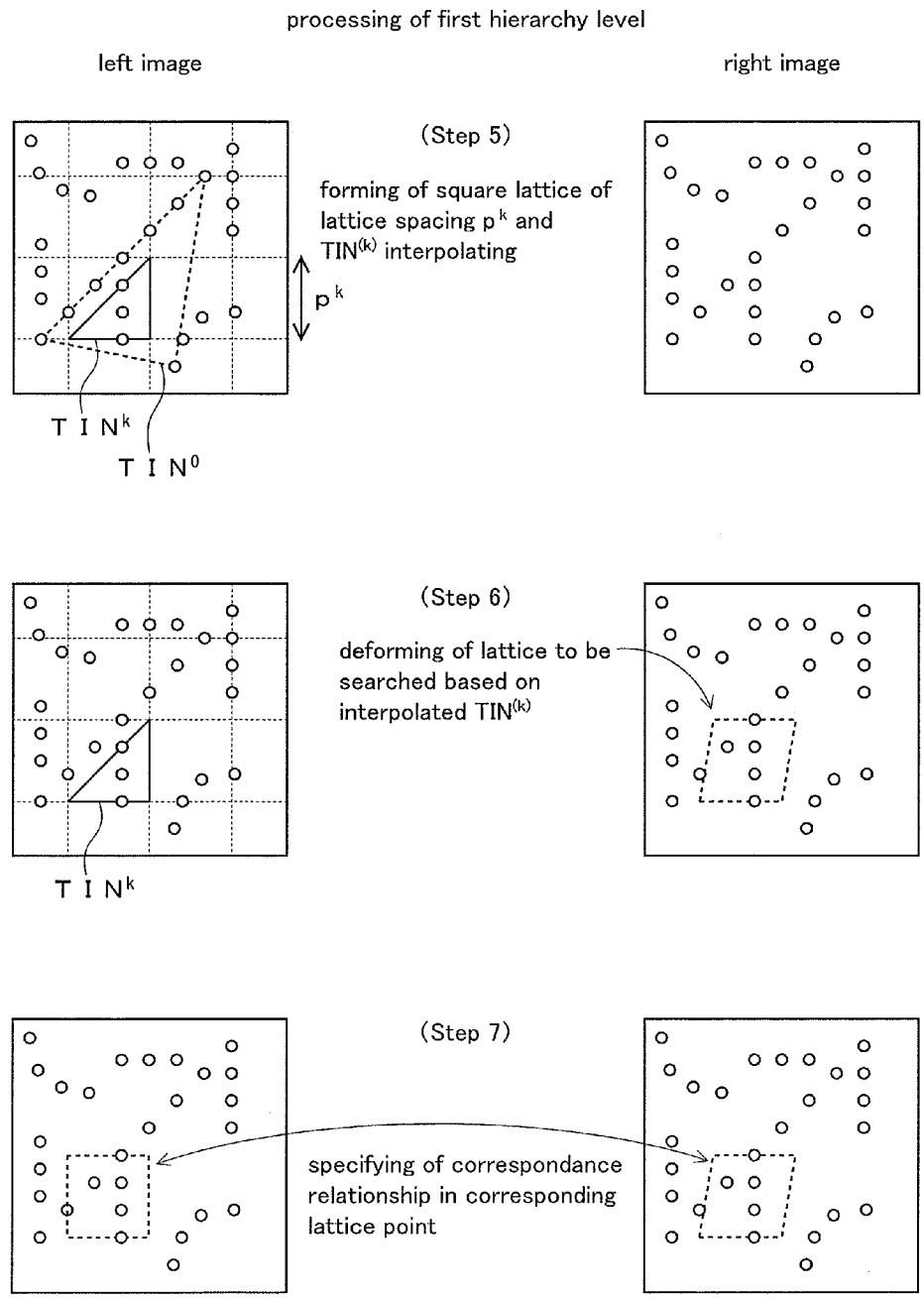
FIG. 9 is a schematic view of left and right photographic images showing stepwise processing states.
Figure 10:
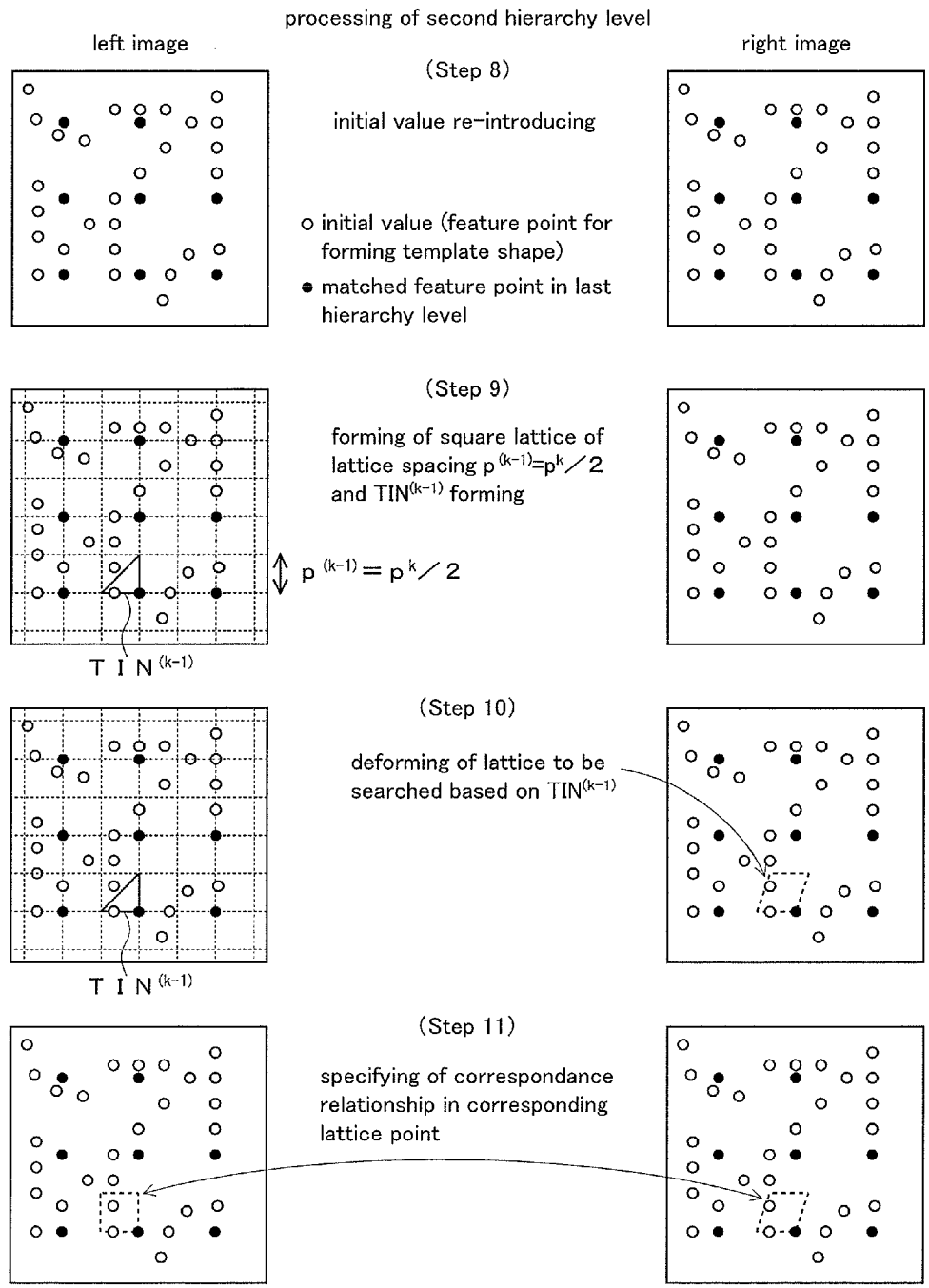
FIG. 10 is a schematic view of left and right photographic images showing stepwise processing states.

FIG. 7 is a flowchart showing an example of matching processing for specifying the correspondence relationship between the feature points of the left and right photographic images. FIGS. 8 to 10 are schematic views of the left and right photographic images showing stepwise processing states. In this processing, feature points in which the matching is specified by an edge matching using edges (lines for forming a contour) of the object to be measured are set to be an initial value, and a lattice point is formed by interpolating this initial value to a lattice. Then, a lattice (a searching range) to which another photographic image corresponds is transformed from the interpolated lattice point, and the stereo matching is carried out within this transformed searching range. Furthermore, this processing is set to be processing of one hierarchy level, and the stereo matching is carried out while decreasing stepwise the searching range, by decreasing lattice spacing sequentially. The feature points in which the matching is specified by an edge matching using edges are sequentially added as an initial value for every one hierarchy level, and the accuracy of the matching is increased by using this initial value in the setting of the search range each time. Here, a curved shape that is approximated by combing a linear edge with multiple edges is shown.

When the processing shown in FIG. 7 is started, first the edge is extracted (Step S401, Step 1). This processing is carried out by an edge extracting unit 511 shown in FIG. 4. FIG. 8 is a schematic view showing one example of the extracted edge. Next, parallax between left and right photographic images in target feature points of the left photographic image and the right photographic image is estimated (Step S402). Here, endpoints which specify the extracted edge are selected by the target feature points. The estimation of the parallax is carried out using pass points, which are secondary feature points for calculating the parallax between the left and right photographic images, which concerns the specific feature points. The pass points are two or more selected points. In this processing, the matching of the pass points is carried out by using a LSM (least squares method) matching or a template matching. Then, the contribution is increased depending on the distance from the target feature point to the pass point, and the weighted mean thereof is assumed to be an estimated value D of the parallax between the left and right photographic images which concern this feature point. Formula 10 is an equation for calculating the estimated value D of the parallax.

$$D = \sum_n \frac{Ls - Ln}{2Ls} Dn \qquad \text{Formula 10}$$

Dn: parallax of each pass point

Ln: distance from target feature point to pass point

Ls: total distance from target feature point to each pass point

According to this method, the accuracy of the calculated value of the parallax in each pass point is low, and error is averaged, even if error is included into the calculated value. Furthermore, error due to a difference between distances from the target points is prevented from increasing, and therefore, the estimated value of the parallax which concerns the feature point can be calculated at a high accuracy. Here, a value of the parallax is calculated for every target feature point, because there is high probability that it differs for every target feature point. Step 2 in FIG. 8 shows images at this stage.

The parallax is estimated in Step S402, and the search range is set for every target feature point based on the estimated parallax (Step S403). Next, a correspondence relationship between the feature points in the left and right photographic images in which the estimated parallax is set to be in the search range is searched for, and a correspondence relationship of the endpoints which constitutes the edge is specified (Step S404, Step 3). This processing is an edge matching. For example, the correspondence relationship is specified using a least-squares matching (LSM). In this case, the high accuracy matching can be carried out, because the correspondence relationship of the feature points along a linear shape, which is easily understood, is obtained within a limited range. In addition, in this case, the matching of points between two endpoints, that is, all feature points that constitute the edge, is carried out using a result of the matching of the endpoints that specifies the edge.

Next, the three-dimensional coordinates of the feature points in the left and right photographic image in which the correspondence relationship was specified in Step S404 (Step 3) is calculated (Step S405, Step 4). This processing is carried out by a front graphic intersection using the above external orientation element obtained in the feature point coordinate calculating unit 514 in FIG. 4. In this case, a three-dimensional coordinate in the local coordinate system in which the external orientation was previously carried out is used. Furthermore, in this case, the calculation of the three-dimensional coordinate is carried out with respect not only to the endpoints, but also to points therebetween, that is, all feature points that constitute the edge.

Next, a processing shown in Step S406 (Step 5 in FIG. 9) is carried out. In this processing, first TIN (Triangular Irregular Network) is made using the feature points (initial values) in which the three-dimensional coordinate was calculated in Step S405 (Step 4 in FIG. 8). TIN is an approximate image in which an image of an object is captured as a cluster of triangular patches. In addition, a square lattice having one side of $p^k$ is formed on one photographic image (in this example, a left photographic image is used). Here, a reference letter k denotes a number of hierarchies. The number of hierarchies k is set to be a value that divides a smaller pixel number between pixel numbers (H, V) of left and right deflection corrected images which is 32 or less pixels by 2, that is, a minimum value of k which satisfies the following equation: min (H, V)/$2^k$≤32. The lattice spacing $p^k$ is calculated by the following equation: $p^k$=Pi×(dm/B), in the case in which a preliminary resolution is set to be Pi, a parallax in a central coordinate of this lattice is set to be dm, and a distance between left and right cameras is set to be B. Here, the value of $p^k$ is a value in which the following TIN can be interpolated.

Then, TIN interpolated in the square lattice is made by interpolating the above TIN in a square lattice having a lattice spacing pk. In this processing, first a Delaunay triangle is obtained by Delaunay-triangulating the feature points on a straight line or a curve which constitute the edge (Step 1 of FIG. 8). Then, z values in the lattice points of the Delaunay triangle are interpolated, and a triangle in which the lattice points are vertexes is obtained. In this case, as a feature point that constitutes the edge, not only an endpoint and a division point, but also a point therebetween, can be used.

FIGS. 9 and 11 show the relationship between TIN$^O$ which is one of the Delaunay triangles (triangles which constitute TIN) formed using the feature points (initial values) in which the three-dimensional coordinate was calculated in Step S405 (Step 4) and TIN$^k$ obtained by interpolating TIN$^O$ in the square lattice. Here, three vertexes of TIN$^O$ are obtained from the feature points in which the three-dimensional coordinate was calculated in Step S405, and three vertexes of TIN$^k$ are vertexes of the lattice. Each vertex of TIN$^k$ is specified by z values of TIN$^O$ on each vertex of the square lattice included in TIN$^O$, as shown in the figures. In this way, a triangle TIN$^k$ interpolated in the square lattice is obtained. In Step 5 of FIG. 9, TIN$^k$ and TIN$^O$ formed by the above steps are shown as a simplified image. Here, as a triangle interpolated in the lattice, only TIN$^k$ is shown; however, the similar processing is carried out in each part of the lattice (each square lattice). The above description is the processing of Step S406 in which the TIN is interpolated in the square lattice.

Figure 11A:
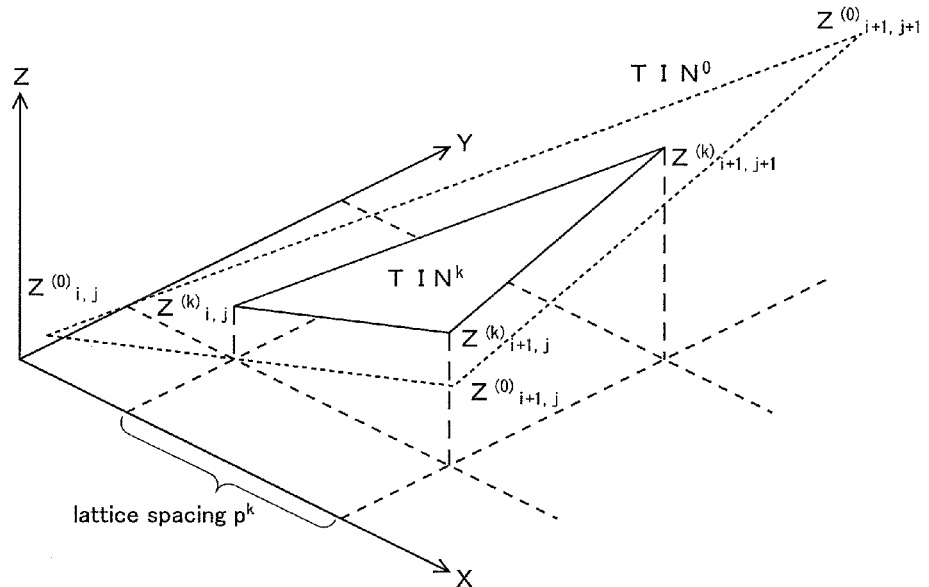
FIG. 11 is a schematic view showing the relationship between a square lattice and TIN.
Figure 11B:
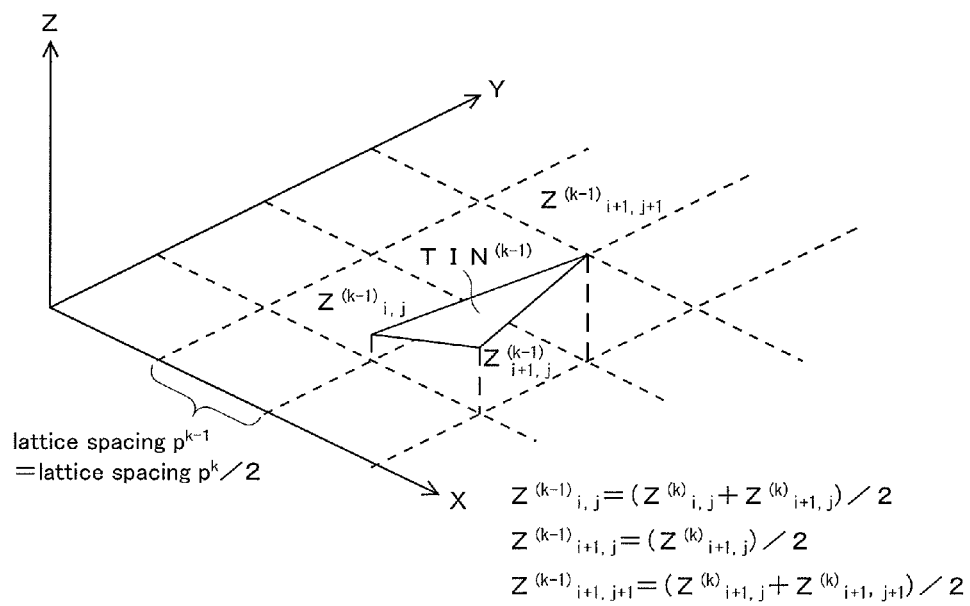

Next, Step S407 is carried out. Here, TIN$^k$ is a shape in which a part of a three-dimensional shape having a depth is approximated to a triangle, and a plane thereof does not always agree with a plane of the photographic image (in some case, it agrees with the plane). Therefore, as shown in FIG. 11A, for example, coordinate values $Z^{(K)}_{i,j}$, $Z^{(K)}_{i+1,j}$, and $Z^{(K)}_{i+1,j+1}$ in a z direction of three vertexes of TIN$^k$ are not the same generally, and TIN$^k$ inclines against the lattice plane. Here, since the three-dimensional coordinate of each vertex of TIN$^k$ is calculated in Step S405, a difference between a direction of a plane of the corresponding lattice and a direction of a plane of TIN$^k$, in other words, an inclination of TIN$^k$ against the corresponding lattice can be quantitatively calculated.

Here, the lattice of the right photographic image corresponding to the square lattice set in the left photographic image is not square and has a shape distorted from that of a square, since the left photographic image and the right photographic image are photographed from different viewpoints. The accuracy of the stereo matching can be increased by obtaining the correspondence relationship between the lattice points set in the left photographic image and the lattice points set in the right photographic image using a LSM, etc., in consideration of this distortion. In Step S407, the above intention is reflected, and the lattice set in the right photographic image is deformed.

This lattice deformation in the right photographic image is carried out as described below. First the same lattice as that in the left photographic image is introduced to the right photographic image. In this case, the positional relationship of the lattices (meshes) in the left and right photographic image is specified using the feature points in which the correspondence relationship was specified in Step S404 (Step 3). Then, a normal vector of the lattice point in the left photographic image is calculated. This normal vector of the lattice point is calculated as an average of normal vectors of a triangular plane that adjoins this lattice point. Here, the normal vector of the plane can be calculated, because the three-dimensional coordinate of each vertex of triangular defined by $TIN^k$ is known. Normal vectors of each vertex of a square lattice are obtained, and then, a shape of the lattice in the right photographic image is deformed by corresponding to directions of the normal vectors. This corresponding lattice (lattice in the right photographic image) is deformed, so as to overcome slippage due to parallax. That is, in this case, since the square lattice in the right photographic image is distorted when the square lattice in the right photographic image is viewed from a viewpoint of the left photographic image, the lattice in the right photographic image is deformed from the square lattice, so as to agree with (or be close to) this distorted shape. Therefore, the lattice deformation set in the right perspective image is carried out based on an inclination of $TIN^k$.

The above steps are one example of the processing carried out in Step S407 (Step 6 in FIG. 9). Next, the correspondence relationship between lattice points (lattice points of transformed lattices) set in the right photographic image and lattice points set in the left photographic image is obtained by a LSM (Step S408, Step 7). Here, this matching processing may be carried out not only by the LSM, but also by other techniques such as a template matching, etc.

Next, the last processing is judged whether it is a final hierarchy level or not (Step S409), when it is the final hierarchy level the processing is finished, or when it is not the final hierarchy level, it proceeds to Step S410. FIG. 10 shows the case in which it proceeds to a second hierarchy level. In FIG. 10, the feature points matched in Step 7 in FIG. 9 are shown by filled circles. These matching points shown by the filled circles are feature points (matching points) in which the correspondence relationship is specified in the left and right photographic images by comparing the lattice points. Here, in the figure, a lattice deformation shown in Step 7 in FIG. 9 is not reflected to positions of the matching points in the right photographic image, in order to simplify the description.

In Step S410, the feature points which constitute the edge specified in Step S404 (Step 3 in FIG. 8) are introduced again to the left and right photographic images as an initial value. In this case, points except for the endpoints and the division point are also objects. For example, in Step 8 in FIG. 10, matching points (filled circle) in the last hierarchy level and initial values (empty circle) are shown. Here, as is apparent from the following explanation, the matching points corresponding to the filled circles are increased as the hierarchy level proceeds to a next hierarchy level, and the matching of the left and right photographic images is more minutely carried out stepwise. In the matching in each hierarchy level, according to mixing the initial value, a basic (or rough) matching can be maintained by the initial value, and therefore, error increasing due to proceeding of the hierarchy level can be prevented.

After Step S410, the lattice spacing is set to be a half in the last processing (Step S411), and the processing in Steps S406 to S410 is carried out again. In Steps 9 to 11 in FIG. 10, one example of the processing in which the lattice spacing is set to be a half in the last processing, is shown. In this case, in $TIN^{k-1}$ which proceeds one hierarchy level from $TIN^k$, Z-values of three positions are calculated by the equations shown in FIG. 11B. That is, a dimension of each side of the lattice is set to be a half (an area ratio is set to be a quarter), and with respect to this lattice, the same processing as that in the last hierarchy level is carried out. In this case, as shown in Step 10 in FIG. 10, the searching range is deformed with respect to the smaller lattice, and the matching between the lattice points in the left and right photographic images is searched (Step 11). Therefore, matching points are specified in more detail.

As is apparent from the case in which Step 4 in FIG. 8 and Step 8 in FIG. 10 are compared, in a next step of Step 11, the number (density) of the matching points is further increased since the matching points are found at the lattice points set in Step 9. Therefore, the number of the matching points is increased as the hierarchy level proceeds to a next hierarchy level such as a second hierarchy level, a third hierarchy level, etc., and the correspondence relationship of the left and right photographic images is minutely specified stepwise.

Three-Dimensional Edge Extracting Unit

A three-dimensional edge extracting unit 515 shown in FIG. 4 will be explained. The three-dimensional edge extracting unit 515 extracts a three-dimensional edge in a three dimensional space based on the correspondence relationship between the feature points which are already calculated and three-dimensional coordinate thereof in the left and right photographic images. That is, the correspondence relationship between endpoints of an edge (a two-dimensional edge) in the left and right photographic images is specified by a matching processing unit 513, and three-dimensional coordinate thereof is calculated by a feature point coordinate calculating unit 514. Therefore, the three-dimensional coordinate of the endpoints of the three-dimensional edge in the three dimensional space is specified, and the three-dimensional edge is specified. This processing is carried out in the three-dimensional edge extracting unit 515. This three-dimensional edge is a line segment that constitutes a three-dimensional structure of an object to be measured, and a three-dimensional model is formed by this three-dimensional edge. As described above, the three-dimensional edge is extracted based on a stereophotographic image in which the object to be measured is photographed from two different viewpoints, and therefore, three-dimensional model data of the object to be measured is formed.

Normal Vector Extracting Unit

An example of Step S500 shown in FIG. 1 in a normal vector extracting unit 600 shown in FIG. 2 will explained in detail. The normal vector extracting unit 600 extracts a normal vector based on a Manhattan world hypothesis, with respect to a three-dimensional model (a laser point cloud three-dimensional model) formed by the three-dimensional model forming unit 420 and a three-dimensional model (an image measuring three-dimensional model) formed by the three-dimensional model forming unit 520. In this processing, three normal vectors for defining three-dimensional directions are extracted from the laser point cloud three-dimensional model and the image measuring three-dimensional model, based on the Manhattan world hypothesis in which "an artificial structure has three dominant axes which cross at right angles to each other and planes which constitute buildings are perpendicularly or horizontally arranged relative to the axes".

Three-Dimensional Model Direction Adjusting Unit

A three-dimensional model direction adjusting unit 700 positions directions of the laser point cloud three-dimensional model and the image measuring three-dimensional model based on the normal vector extracted by the normal vector extracting unit 600. Here, the three normal vectors are a normal vector in a perpendicular direction (a vertical direction) and horizontal biaxial normal vectors that cross at right angles to the perpendicular direction. The three-dimensional model direction adjusting unit 700 rotates one or both of the three-dimensional models, so as to approximately agree with directions of two normal vectors. Therefore, directions of the laser point cloud three-dimensional model and the image measuring three-dimensional model are in approximate agreement. Here, in this condition, the image measuring three-dimensional model is a relative model having no actual scale, and since it contracts or expands in a specific direction, two three-dimensional models do not match, even if the directions agree.

Three-Dimensional Edge Positioning Unit

Figure 12:
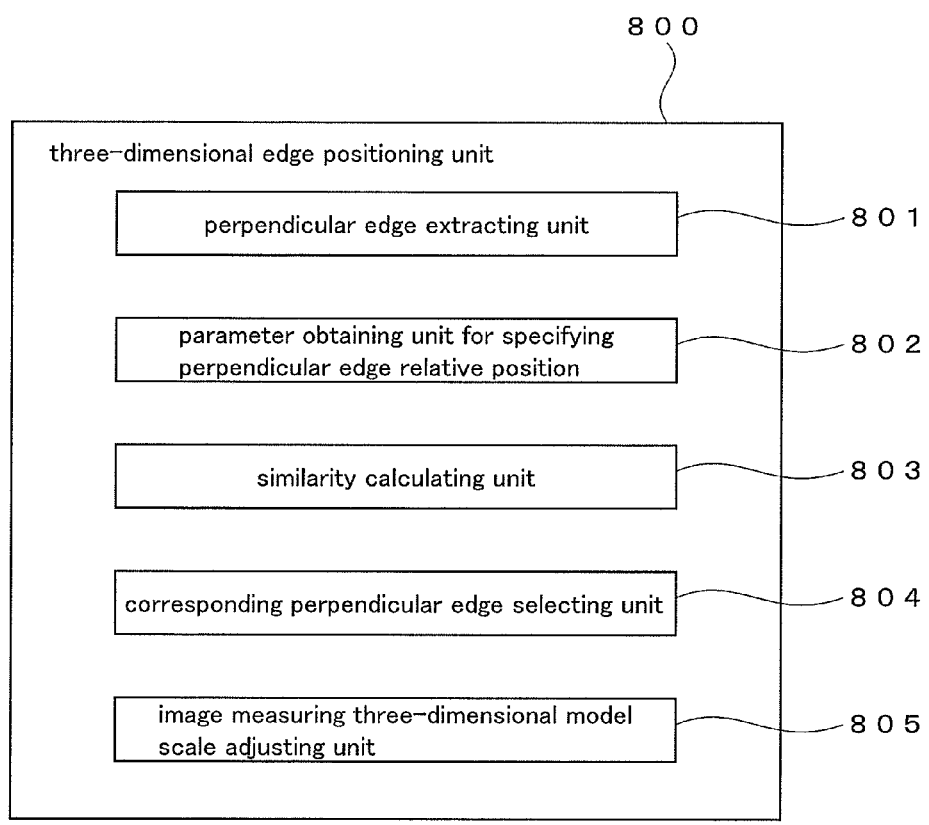
FIG. 12 is a block diagram of a three-dimensional edge positioning unit.

A three-dimensional edge positioning unit 800 shown in FIG. 2 searches for a combination of three-dimensional edges in a perpendicular direction in one three-dimensional model having a similar positional relationship using distances and angles between multiple three-dimensional edges in a perpendicular direction in the other three-dimensional model. As shown in FIG. 12, the three-dimensional edge positioning unit 800 shown in FIG. 2 has a perpendicular edge extracting unit 801, a parameter obtaining unit 802 for specifying a relative position of a perpendicular edge, a similarity calculating unit 803, a correspondence perpendicular edge selecting unit 804 and an image measuring three-dimensional model scale adjusting unit 805.

The perpendicular edge extracting unit 801 is an example of "an extracting unit for extracting multiple three-dimensional edges that extend in a specific direction from a first three-dimensional model as a first group of three-dimensional edges, and for extracting multiple three-dimensional edges that extend in the same direction as the specific direction from a second three-dimensional model as a second group of three-dimensional edges" in the present invention. In this example, the perpendicular edge extracting unit 801 extracts three or more edges in a perpendicular direction (perpendicular edges) from each of the three-dimensional model, respectively. The perpendicular direction is determined based on information of triaxial normal vectors that has already been obtained. It is necessary to use at least three perpendicular edges, since similarity of the perpendicular edge between two three-dimensional models is judged using the relative positional relationship of the perpendicular edge, as describe below. Of course, the greater the number of the three-dimensional models, the greater is the matching accuracy of two three-dimensional models.

Figure 13A:
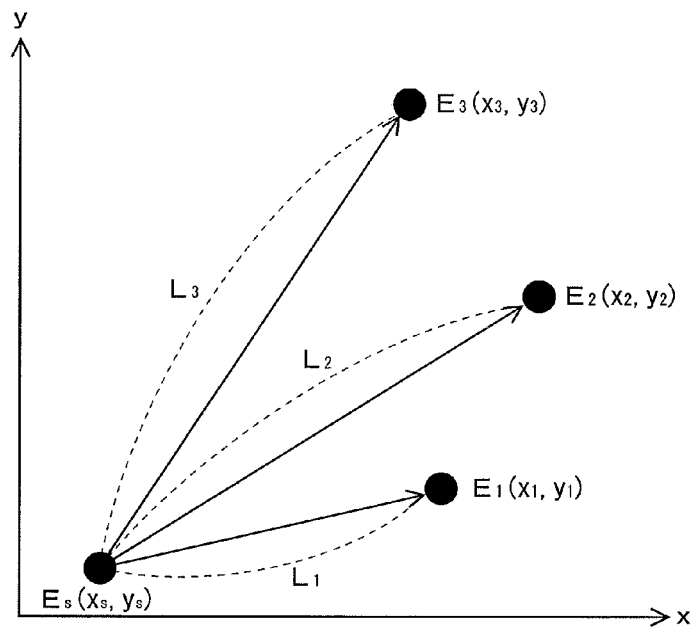
FIG. 13 is a schematic view showing the relationship of distance and angle between perpendicular edges.

The parameter obtaining unit 802 for specifying a relative position of a perpendicular edge is one example of "a specifying unit for specifying a relative position against other multiple three-dimensional edges in each of the first group of three-dimensional edges and a relative position against other multiple three-dimensional edges in each of the second group of three-dimensional edges" in the present invention. The parameter obtaining unit 802 for specifying a relative position of a perpendicular edge calculates a distance between a target perpendicular edge and the other perpendicular edge and an angle direction of the other perpendicular edge viewed from a target perpendicular edge. Specifically, a length and a direction of a vector from the target perpendicular edge to the other perpendicular edge are calculated. In the following, the parameter obtaining unit 802 for specifying a relative position of a perpendicular edge will be explained. FIG. 13 is a schematic view showing a distance and an angle between multiple perpendicular edges. In FIG. 13, two axes that cross at right angles to a horizontal direction are denoted as an x axis and a y axis. FIG. 13A shows an aspect in which four perpendicular edges are viewed from an upside in a perpendicular direction when the four perpendicular edges are extracted. In FIG. 13, the perpendicular edge is indicated by a filled circle. First, a standard perpendicular edge Es (xs, ys), which is the target perpendicular edge, is selected from the four perpendicular edges, as shown in FIG. 13A. Then, lengths Li (l1, l2, l3) between the standard perpendicular edge Es (xs, ys) and residual perpendicular edges Ei (E1, E2, E3) are calculated using Formula 11.

$$L_i = E_i - E_s = \sqrt{(x_i - x_s)^2 + (y_i - y_s)^2} \, (i=1\sim 3) \qquad \text{Formula 11}$$

Figure 13B:
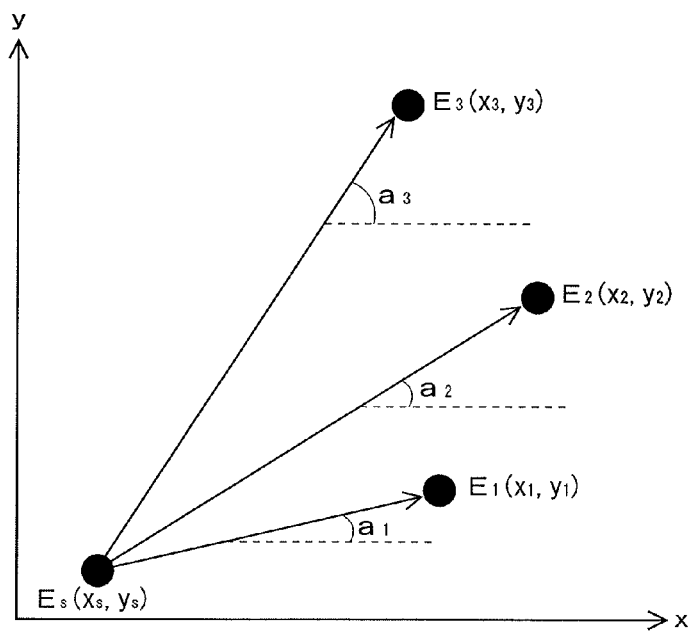

Next, a direction (an angle direction) of the other perpendicular edge viewed from the standard perpendicular edge is calculated. FIG. 13B is a schematic view which explains a method for calculating the angle between the perpendicular edges. Here, since directions of two three-dimensional models are approximately aligned already, a calculated value of the angle is expressed by an absolute value, and angle differences ai (a1, a2, a3) between a vector from the standard perpendicular edge to the residual perpendicular edge and an x axis of this vector are calculated.

As described above, the relative distance Li and the angle ai from the standard perpendicular edge Es (xs, ys) to the residual perpendicular edge Ei are calculated in each of the image measuring three-dimensional model and the laser point cloud three-dimensional model. The above calculation is carried out with respect to all combinations of extracted perpendicular edges. For example, in the aspects shown in FIG. 13, the same processing is carried out as a standard perpendicular edge with respect to a perpendicular edge which corresponds to E1, then, the same processing is carried out as a standard perpendicular edge with respect to a perpendicular edge which corresponds to E2, and next, the same processing is carried out as a standard perpendicular edge with respect to a perpendicular edge which corresponds to E3.

In this way, a combination (Li, ai) of Li and ai in the image measuring three-dimensional model and a combination (Li', ai') of Li and ai in the laser point cloud three-dimensional model are obtained. Here, (Li, ai) and (Li', ai') can be handled as a parameter which specifies the positional relationship of the target perpendicular edge against the other perpendicular edge. That is, a combination of multiple vectors from Es to Ei is a parameter that shows the positional relationship between the target perpendicular edge and the other perpendicular edge, and it is inherent information that specifies this target perpendicular edge. For example, in multiple perpendicular edges, (Li, ai) is not equal in theory, and (Li, ai) is different depending on each perpendicular edge. Therefore, (Li, ai) and (Li', ai') are parameters for specifying a relative position which specifies the relative position in the target perpendicular edge. The parameter obtaining unit 802 for specifying a relative position of a perpendicular edge obtains calculates (Li, ai) and (Li', ai') and it obtains data thereof.

The similarity calculating unit 803 is one example of "a similarity calculating unit for calculating a similarity between each of the first group of three-dimensional edges and each of the second group of three-dimensional edges" in the present invention. The similarity calculating unit 803 calculates the similarity of the perpendicular edges between the three-dimensional models, using (Li, ai) and (Li', ai') obtained by the parameter obtaining unit 802 for specifying a relative position of a perpendicular edge. In this processing, first a parameter Δmi which evaluates a difference in Li and Li' and a parameter Δai which evaluates a difference in ai and ai' are introduced. The parameter Δmi is defined by Formula 12 when a standard length is set to be Ls, and the parameter Δai is defined by Formula 13.

$$\Delta m_i = (\Delta L_i / \Delta L_s) = \{(L_i/L_s) - (L_i'/L_s')\}' \qquad \text{Formula 12}$$

$$\Delta a_i = a_i - a_i' \qquad \text{Formula 13}$$

Here, residual J (Δmi, Δai) between (Li, ai) and (Li', ai') is considered. The smaller this residual, the higher the similarity of the target perpendicular edge between two three-dimensional models. This similarity S is evaluated by Formula 14.

$$S = \Sigma_{i=1}^n S_i = \Sigma_{i=1}^n \exp(-r \cdot j(\Delta m_i, \Delta a_i)) \qquad \text{Formula 14}$$

Here, n is a number of edges to be compared, and in the case shown in FIG. 13, n is 3, and Ls is any one of L1, L2 and L3. A coefficient r in Gibbs distribution is set to be 0.05. In Formula 14, the greater the similarity, the closer to 1 is the Si. With respect to all combinations, S is calculated using Formula 14. The above processing is carried out in the similarity calculating unit 803.

The corresponding perpendicular edge selecting unit 804 is one example of "a selecting unit for selecting one edge in the second group of three-dimensional edges corresponding to one edge in the first group of three-dimensional edges based on the similarity" in the present invention. The corresponding perpendicular edge selecting unit 804 selects a combination of the perpendicular edges in which the similarity S is the highest, as a perpendicular edge that corresponds between the image measuring three-dimensional model and the laser point cloud three-dimensional model, based on the similarity calculated by the similarity calculating unit 803.

For example, in FIG. 13, a position of a perpendicular edge Es on an x-y plane against perpendicular edges E1, E2 and E3 is an inherent value. This is the same, even if the other perpendicular edge is focused on. Therefore, (Li, ai) value of a specific perpendicular edge in a left photographic image and (Li, ai) value of a specific perpendicular edge in a right photographic image are compared and a combination having the smallest difference is extracted as a corresponding perpendicular edge between left and right photographic images. That is, the combination of the specific perpendicular edge in the left photographic image and the specific perpendicular edge in the right photographic image is considered, values shown in Formula 14 are calculated in the combination, and the corresponding perpendicular edge between the left and right photographic images can be extracted by selecting a combination in which the values are the largest.

The image measuring three-dimensional model scale adjusting unit 805 performs an affine transformation on the image measuring three-dimensional model, so as to position the perpendicular edge selected by the corresponding perpendicular edge selecting unit 804, and the image measuring three-dimensional model and the laser point cloud three-dimensional model; in other words, the processing in which the image measuring three-dimensional model and the laser point cloud three-dimensional model are matched. In this processing, a magnification and an affine coefficient against the laser point cloud three-dimensional model of the image measuring three-dimensional model are calculated, and an actual size in the image measuring three-dimensional model is calculated by an affine transformation in which a scale of each axis is the same magnification. That is, the image measuring three-dimensional model is expanded and contracted while moving, so that the perpendicular edges having a combination in which the similarity calculated using Formula 14 is the highest are overlapped. As described above, the image measuring three-dimensional model is not isotropic, and a scale depending on a direction is not uniform. Therefore, the image measuring three-dimensional model is expanded and contracted while moving against the laser point cloud three-dimensional model, so that multiple perpendicular edges in which matching is carried out (that is, the correspondence is clear) are overlapped.

Then, an actual scale is imposed on the image measuring three-dimensional model in a condition in which the matched perpendicular edges out are overlapped. Here, in order to carry out a more detailed positioning, a more detailed matching can be carried out by an ICP (Iterative Closest Point) method, after the above positioning.

Three-Dimensional Model Integrating Unit

A three-dimensional model integrating unit 900 shown in FIG. 2 will be explained. The three-dimensional model integrating unit 900 forms an integrated three-dimensional model in which an image measuring three-dimensional model and the laser point cloud three-dimensional model are integrated, based on the correspondence relationship of the perpendicular edges searched for in the three-dimensional edge positioning unit 800. In this integrated three-dimensional model, a part in which occlusion is generated in the laser point cloud three-dimensional model is compensated for by the image measuring three-dimensional model.

Figure 14:
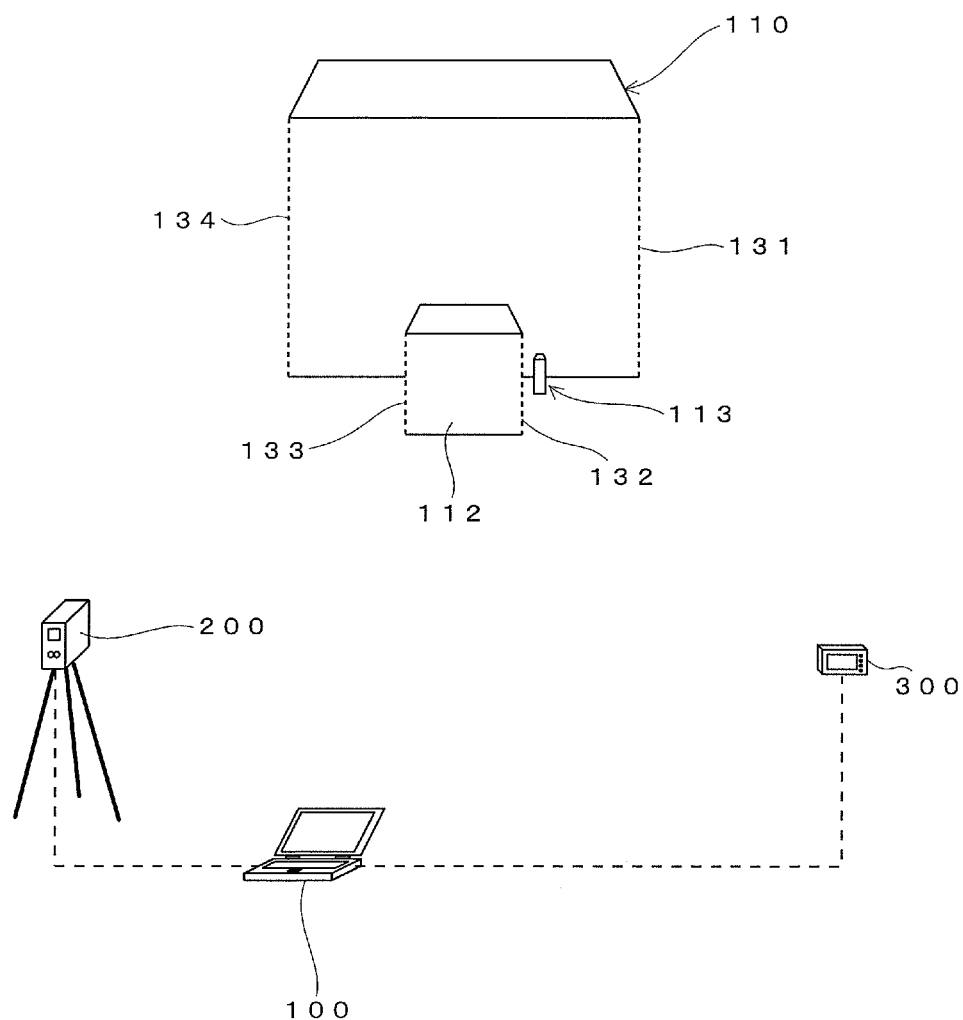
FIG. 14 is a schematic view showing laser scanning and photographing of buildings.
Figure 15A:
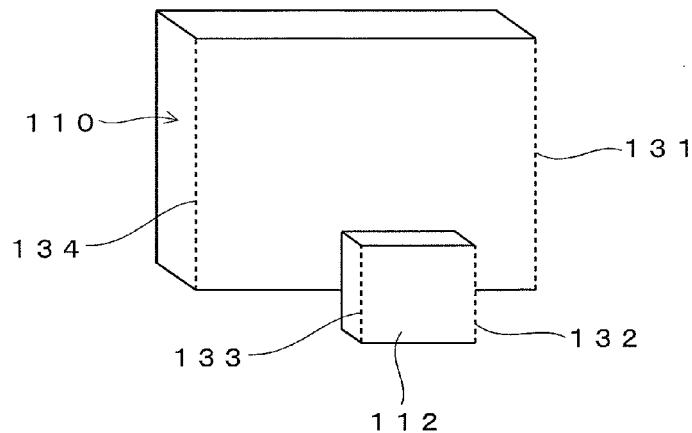
FIG. 15 is a schematic view showing occlusion generated in carrying out measurement shown in FIG. 14.
Figure 15B:
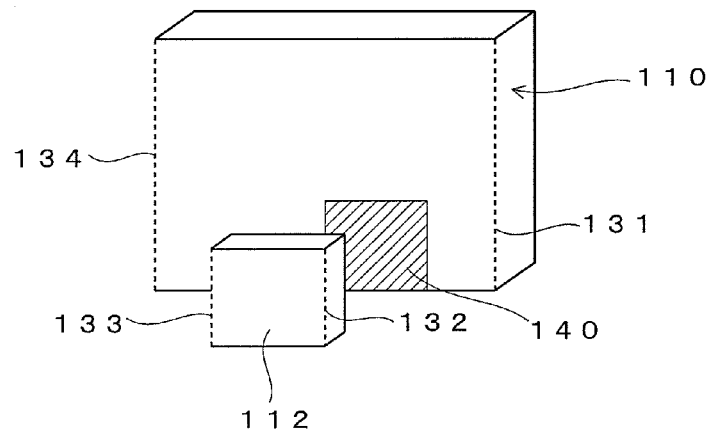
Figure 15C:
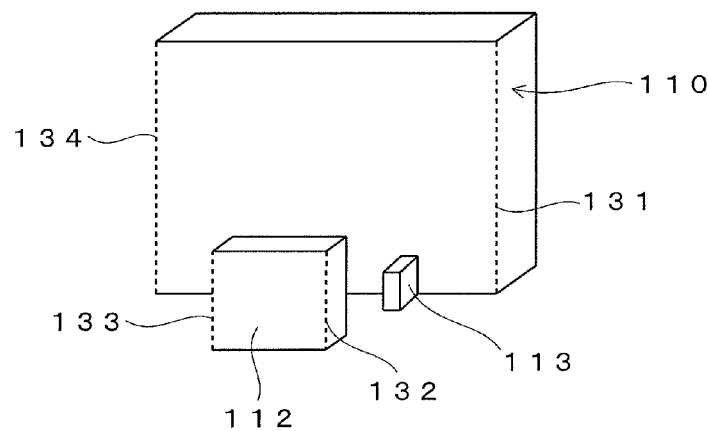

FIG. 14 is a schematic view showing laser scanning and photographing buildings, and FIG. 15 is a schematic view showing occlusion generated in measuring shown in FIG. 14. Buildings 110, 112 and 113 are shown in FIG. 14. The laser scanner 200, an optical data processing unit 100 using a personal computer, and a digital camera 300 are shown in FIG. 14. Here, a left photographic image and a right photographic image are each taken from a different viewpoint by the digital camera 300, and a stereophotographic image is formed by the images (not shown). FIG. 14 shows an example in which a building 113 is hidden by a building 112, so as to generate occlusion, when it is viewed from a viewpoint of the laser scanner 200.

A shaded area 140 shown in FIG. 15 denotes a part in which the occlusion is generated when it is viewed from the laser scanner 200. Therefore, the building 113 is missing from the laser point cloud three-dimensional model obtained from the laser scanner 200. In contrast, the building 113 can be photographed from a viewpoint of the digital camera 300. Therefore, the image measuring three-dimensional model based on the stereophotographic image taken by the digital camera 300 and the laser point cloud three-dimensional model obtained from the laser scanner 200 are integrated, and thereby, a three-dimensional model in which the building 113 is described can be obtained.

Here, perpendicular edges 131, 132, 133 and 134 denoted by broken lines are common perpendicular edges in which the image measuring three-dimensional model based on the stereophotographic image taken by the digital camera 300 and the laser point cloud three-dimensional model obtained from the laser scanner 200. That is, the perpendicular edges 131, 132, 133 and 134 are included in the point cloud position data obtained from the laser scanner 200, and are included in the stereophotographic image taken by the digital camera 300. The perpendicular edges 131, 132, 133 and 134 are corresponded between both of the three-dimensional models by a function of the three-dimensional edge positioning unit 800 shown in FIG. 12. Then, the image measuring three-dimensional model based on a stereophotographic image taken by the digital camera 300 and the laser point cloud three-dimensional model obtained from the laser scanner 200 are integrated by a function of the three-dimensional model integrating unit 900 shown in FIG. 2, and an integrated three-dimensional model in which occlusion is not generated by the building 113 is obtained.

Advantages

As described above, in the present embodiment, the correspondence relationship of the perpendicular edges is obtained based on an assumption in which the object is a building, in the processing for integrating the three-dimensional model obtained from the point cloud position data and the three-dimensional model obtained from the stereophotographic image. In this case, one perpendicular edge is defined by the relative position relationship with the other perpendicular edge, and the correspondence relationship of the perpendicular edges between the three-dimensional models is searched for in comparison with this relative position relationship.

According to this technique, an amount of data for defining an edge is less than that in the case in which a point cloud itself is handled and the edge is easily understood (in other words, it is easily distinguished from another part). Therefore, the correspondence relationship between the point cloud position data obtained from the laser scanner and the feature points in the photographic image is high accuracy and efficiently decided. In particular, the edge is specified by endpoints of both ends, and therefore, the amount of data to be handled can be decreased and the burden of calculation can be reduced.

As a parameter that defines the perpendicular edge, a parameter in which the perpendicular edge is remarkably defined in each three-dimensional model, in other words, a parameter in which the perpendicular edge is distinguished from other perpendicular edges and is specified can be obtained using the relative position relationship to other multiple perpendicular edges. Therefore, a corresponding perpendicular edge can be searched for efficiently and with high accuracy in two three-dimensional models.

As a method for defining the perpendicular edge, the corresponding perpendicular edge can be calculated efficiently and with high accuracy in two three-dimensional models using a combination of vectors that connect one perpendicular edge with the other perpendicular edge which are viewed from a perpendicular direction. In particular, high efficiency and high accuracy can be obtained by a method for specifying the perpendicular edge using a length of the vector and an angle against a predetermined specific direction.

The feature points for orientating to be extracted can be extracted from the images, without deflection, by carrying out an automatic orientation based on the perpendicular edge for extracting the calculation of the external orientation element of the stereophotographic image from the photographic image. When the feature points for orientating are extracted from a deflected region, the accuracy of the relative orientation is decreased, or the accuracy of the calculated external orientation element is decreased by increasing calculation of unexpected values. The accuracy of the three-dimensional measuring using the stereophotographic image is decreased by decreasing the accuracy of the external orientation element. In contrast, when the perpendicular edge is extracted from the photographic image, an extracted position in the image is prevented from deflecting, and therefore, the accuracy of the external orientation element can be prevented from decreasing.

In addition, the calculating method of the external orientation element shown in the present embodiment does not require to set an target or to measure the target, and it requires only to take a left photographic image and a right photographic image for forming a stereophotographic image, and therefore, the burden on an operator at the scene can be greatly reduced.

Furthermore, the external orientation element obtained in the above automatic orientation does not have an actual scale because a scale for calculating is set to be a suitable value, and the scale has a coordinate system which expands or contracts in a specific direction. Therefore, the image measuring three-dimensional model does not have an actual scale before it is integrated with the laser point cloud three-dimensional model, and it is described by the above coordinate system that expands or contracts in a specific direction. However, in positioning using the corresponding perpendicular edge, the image measuring three-dimensional model is matched with the laser point cloud three-dimensional model by affine-transforming, so as to provide the actual scale thereto. Then, a three-dimensional model in which the laser point cloud three-dimensional model and the image measuring three-dimensional model are integrated can be formed.

Other Matters

Although an object of the processing shown in FIG. 13 is the perpendicular edge, it may be an edge in another direction. Extraction of an edge in a specific direction may use a method other than the above technique using the Manhattan world hypothesis. For example, the extraction of an edge in a specific direction can be carried out by a method in which (1) an edge is extracted, (2) each of a triaxial direction of the extracted edge is classified, and (3) an edge in a specific direction that is outstanding is extracted from the classified edges. In the following, an example of this processing will be explained. First, an edge is extracted in each of the left and right photographic images. Next, edges that extend in the same direction are collected, and a total extended distance is calculated. Next, the longest ranking three total expanded distances are selected, a first edge group is classified as a main edge, and a second edge group and a third edge group are set to be biaxial edges which cross right angles to the main edge. For example, when a tall building is an object, the main edge is chosen as a perpendicular edge, and when a low building extending in a horizontal direction is an object, one axis in a horizontal direction is selected as an extending direction of the main edge.

Some of the functions of the optical data processing unit 100 shown in FIG. 2 may be carried out by a different device. For example, in some cases, two computers are connected by a circuit, a part of function of the optical data processing unit 100 is carried out by a first computer, a calculated result is sent to a second computer, and a residual function thereof is carried out by the second computer. In this case, a system that connects these two computers is understood to be an optical data processing system using the present invention.

2. Second Embodiment

In the first embodiment, the case in which a main three-dimensional model is a laser point cloud three-dimensional model and an image measuring three-dimensional model is used in order to compensate for a part in which occlusion is generated in the laser point cloud three-dimensional model, was explained. Conversely, the image measuring three-dimensional model may be a main three-dimensional model and the laser point cloud three-dimensional model may be used for compensating in the main model. In this case, a procedure of the processing is the same as that of the First Embodiment. It is difficult for an object range of the image measuring three-dimensional model to be wider and a part of the range (including a part in which the occlusion is generated, a part having low accuracy, etc.) is compensated for by the laser point cloud three-dimensional model.

In this case, the image measuring three-dimensional model may not have an actual scale as described in the First Embodiment, and it may have an actual scale in which the external orientation element was previously measured. When the image measuring three-dimensional model has the actual scale, the image measuring three-dimensional model and the laser point cloud three-dimensional model are integrated by carrying out the processing shown in FIGS. 7 and 13.

As an example in which the image measuring three-dimensional model is a main three-dimensional model, a case in which the three-dimensional model obtained by an aerial photogrammetry using an Unmanned Aerial Vehicle (UAV), etc., is a main three-dimensional model and a part in which the occlusion is generated or a part having low accuracy is compensated for by the laser point cloud three-dimensional model obtained by laser-scanning which is carried out on the ground, can be used. Here, in some cases, it is not clear that any one of the laser point cloud three-dimensional model and the image measuring three-dimensional model is a main three-dimensional model or an auxiliary three-dimensional model. In some cases, one three-dimensional model includes occlusion, and it is compensated for by the other three-dimensional model.

3. Third Embodiment

Both of two three-dimensional models to be integrated may be laser point cloud three-dimensional models. In this case, the laser scanning is carried out from each of different viewpoints, a first laser point cloud three-dimensional model and a second laser point cloud three-dimensional model are obtained, and these two three-dimensional models are integrated by the procedure shown in the First Embodiment. Here, positioning in Step S700 in FIG. 1 is carried out by a rigid body conversion (including slight direction compensation) or parallel translation, which is not an affine transformation, with respect to one or both of the three-dimensional models, since the two three-dimensional models are absolute models in which coordinate values of the point cloud position are found. Therefore, in the case of this example, a part denoted by a reference numeral 805 in FIG. 12 functions as a rigid body conversion processing unit or a parallel translation processing unit of the three-dimensional model.

4. Fourth Embodiment

Both of two three-dimensional models to be integrated may be image measuring three-dimensional models. In this case, stereophotographic images are obtained from each of different viewpoints, a first image measuring three-dimensional model based on a first stereophotographic image and a second image measuring three-dimensional model based on a second stereophotographic image are obtained, and these two three-dimensional models are integrated by the procedure shown in the First Embodiment. Here, a first aspect in which both of two three-dimensional models are relative models having no actual scale, a second aspect in which one of the models is a relative model and the other of the three-dimensional models is an absolute model having a known coordinate value, and a third aspect in which both of the models are absolute models, can be used.

In the present embodiment, when two three-dimensional models to be matched are relative models, an affine transformation is carried out with respect to one or both of the three-dimensional models, whereby both of the models are positioned. When one of the three-dimensional models is an absolute model and the other of the three-dimensional models is a relative model, an affine transformation is carried out with respect to the other of the three-dimensional models which is a relative model, whereby both of the models are positioned.

For example, in an autonomously mobile robot, Simultaneous Localization and Mapping (SLAM): a technique in which a self position estimation and an environmental mapping are simultaneously carried out, is used. However, in this technique, in some cases, it is necessary to obtain the correspondence relationship between the first image measuring three-dimensional model calculated based on the stereophotographic image photographed from a first position and the second image measuring three-dimensional model calculated based on the stereophotographic image photographed from a second position. In such cases, the present invention can be used in techniques that require a correspondence relationship between the first three-dimensional model and the second three-dimensional model.

INDUSTRIAL APPLICABILITY

The present invention can be used in techniques of measuring three-dimensional information.

The invention claimed is:
1. An optical data processing device comprising:
processing circuitry configured to:
extract at least three three-dimensional edges that extend in a specific and same direction from a first three-dimensional model, as a first group of three-dimensional edges, and for extracting at least three three-dimensional edges that extend in the specific and same direction from a second three-dimensional model, as a second group of three-dimensional edges,
specify a relative position against other plural three-dimensional edges in each of the first group of three-dimensional edges and a relative position against other plural three-dimensional edges in each of the second group of three-dimensional edges,
calculate a similarity between the relative position in each of the first group of three-dimensional edges and the relative position in each of the second group of three-dimensional edges, and
select one edge in the second group of three-dimensional edges corresponding to one edge in the first group of three-dimensional edges based on the similarity,
wherein each relative position is specified based on a distance between a target three-dimensional edge and a respective of the other plural three-dimensional edges and an angle direction of the respective of the other plural three-dimensional edges viewed from the target three-dimensional edge, and
wherein each relative position is defined by a combination of multiple vectors in which a specific three-dimensional edge and other multiple three-dimensional edges are connected.

2. The optical data processing device according to claim 1, wherein the similarity is evaluated by lengths of the multiple vectors and angles of the multiple vectors against a predetermined first direction.

3. The optical data processing device according to claim 1, wherein the specific direction is a perpendicular direction.

4. The optical data processing device according to claim 1, wherein the specific three-dimensional edge is specified by endpoints of a line segment that constitutes the specific three-dimensional edge.

5. The optical data processing device according to claim 1, wherein at least one of the first three-dimensional model and the second three-dimensional model is a three-dimensional model based on a stereophotographic image.

6. The optical data processing device according to claim 5, the processing circuitry further configured to calculate an external orientation element of left and right photographic images based on a perpendicular edge in the left and right photographic images that constitute the stereophotographic image.

7. The optical data processing device according to claim 6,
wherein the three-dimensional model based on the stereophotographic image expands or contracts, and
the processing circuitry further configured to:
adjust a scale of the three-dimensional model based on the stereophotographic image, so as to match each position of the first group of three-dimensional edges and each position of the second group of three-dimensional edges selected by a selecting unit, and
integrate the three-dimensional model based on the stereophotographic image in which the scale is adjusted and other three-dimensional models, based on a combination of the first group of three-dimensional edges and the second group of three-dimensional edges selected by the selecting unit.

8. The optical data processing device according to claim 1, wherein the first three-dimensional model is a three-dimensional model based on a three-dimensional point cloud position data obtained by a reflected light of a laser beam, and the second three-dimensional model is a three-dimensional model based on a stereophotographic image or the first three-dimensional model and the second three-dimensional model are three-dimensional models based on a stereophotographic image.

9. The optical data processing device according to claim 1, wherein the first three-dimensional model and the second three-dimensional model are three-dimensional models based on three-dimensional point cloud position data obtained by a reflected light of a laser beam.

10. An optical data processing system comprising:
processing circuitry configured to:
extract at least three three-dimensional edges that extend in a specific and same direction from a first three-dimensional model, as a first group of three-dimensional edges, and for extracting at least three three-dimensional edges that extend in the specific and same direction from a second three-dimensional model, as a second group of three-dimensional edges,
specify a relative position against other plural three-dimensional edges in each of the first group of three-dimensional edges and a relative position against other plural three-dimensional edges in each of the second group of three-dimensional edges,
calculate a similarity between the relative position in each of the first group of three-dimensional edges and the relative position in each of the second group of three-dimensional edges, and
select one edge in the second group of three-dimensional edges corresponding to one edge in the first group of three-dimensional edges based on the similarity,
wherein each relative position is specified based on a distance between a target three-dimensional edge and a respective of the other plural three-dimensional edges and an angle direction of the respective of the other plural three-dimensional edges viewed from the target three-dimensional edge, and
wherein each relative position is defined by a combination of multiple vectors in which a specific three-dimensional edge and other multiple three-dimensional edges are connected.

11. An optical data processing method comprising:
extracting at least three three-dimensional edges that extend in a specific and same direction from a first three-dimensional model, as a first group of three-dimensional edges, and for extracting at least three three-dimensional edges that extend in the specific and same direction from a second three-dimensional model, as a second group of three-dimensional edges,
specifying a relative position against other plural three-dimensional edges in each of the first group of three-dimensional edges and a relative position against other plural three-dimensional edges in each of the second group of three-dimensional edges,
calculating a similarity between the relative position in each of the first group of three-dimensional edges and the relative position in each of the second group of three-dimensional edges, and
selecting one edge in the second group of three-dimensional edges corresponding to one edge in the first group of three-dimensional edges based on the similarity,
wherein each relative position is specified based on a distance between a target three-dimensional edge and a respective of the other plural three-dimensional edges and an angle direction of the respective of the other plural three-dimensional edges viewed from the target three-dimensional edge, and
wherein each relative position is defined by a combination of multiple vectors in which a specific three-dimensional edge and other multiple three-dimensional edges are connected.

12. A non-transitory computer readable medium including an optical data processing program that is read and run by a computer, the program actuating the computer to operate as:
an extracting means for extracting at least three three-dimensional edges that extend in a specific and same direction from a first three-dimensional model, as a first group of three-dimensional edges, and for extracting at least three three-dimensional edges that extend in the specific and same direction from a second three-dimensional model, as a second group of three-dimensional edges,
a specifying means for specifying a relative position against other plural three-dimensional edges in each of the first group of three-dimensional edges and a relative position against other plural three-dimensional edges in each of the second group of three-dimensional edges,
a similarity calculating means for calculating a similarity between the relative position in each of the first group of three-dimensional edges and the relative position in each of the second group of three-dimensional edges, and a selecting means for selecting one edge in the second group of three-dimensional edges corresponding to one edge in the first group of three-dimensional edges based on the similarity, wherein each relative position is specified based on a distance between a target three-dimensional edge and a respective of the other plural three-dimensional edges and an angle direction of the respective of the other plural three-dimensional edges viewed from the target three-dimensional edge, and wherein each relative position is defined by a combination of multiple vectors in which a specific three-dimensional edge and other multiple three-dimensional edges are connected.

* * * * *